US012301725B2

(12) United States Patent
Fournier et al.

(10) Patent No.: US 12,301,725 B2
(45) Date of Patent: May 13, 2025

(54) APPARATUSES AND METHODS FOR FACILITATING CRYPTOGRAPHICALLY MEDIATED ORGANIZATIONS AND TOKENS AND RELATED INTERACTIONS

(71) Applicant: Portable Data Corp, Oakland, CA (US)

(72) Inventors: James Fournier, Nicasio, CA (US); Victor Grey, Concord, CA (US); Jared Grippe, Grass Valley, CA (US)

(73) Assignee: PORTABLE DATA CORPORATION, Oakland, CA (US)

( * ) Notice: Subject to any disclaimer, the term of this patent is extended or adjusted under 35 U.S.C. 154(b) by 290 days.

(21) Appl. No.: 17/721,633

(22) Filed: Apr. 15, 2022

(65) Prior Publication Data

US 2022/0337424 A1 Oct. 20, 2022

Related U.S. Application Data

(60) Provisional application No. 63/175,925, filed on Apr. 16, 2021.

(51) Int. Cl.
*H04L 9/32* (2006.01)
*H04L 9/00* (2022.01)

(52) U.S. Cl.
CPC .......... *H04L 9/3247* (2013.01); *H04L 9/3236* (2013.01); *H04L 9/50* (2022.05); *H04L 2209/56* (2013.01)

(58) Field of Classification Search
CPC ....... H04L 9/3247; H04L 9/50; H04L 9/3236; H04L 2209/56
See application file for complete search history.

(56) References Cited

U.S. PATENT DOCUMENTS 10,425,230 B1 * 9/2019 Tang ................. G06F 21/64
10,521,780 B1 * 12/2019 Hopkins, III .......... G06Q 20/12
(Continued)

FOREIGN PATENT DOCUMENTS

WO 2017/147692 9/2017
WO 2019/070419 4/2019

OTHER PUBLICATIONS

"Keri: For every DID, a microledger," published Oct. 19, 2020 by Decentralized Identity Foundation, available online at https://medium.com/decentralized-identity/keri-for-every-did-a-microledger-f9457fa80d2d, retrieved and last visited Jun. 17, 2024.
(Continued)

*Primary Examiner* — Jason Chiang
(74) *Attorney, Agent, or Firm* — David R. Stevens; Stevens Law Group

(57) ABSTRACT

A method for facilitating decentralized autonomous organizations (DAOs) includes, using one or more computer processors, receiving, from each of a plurality of parties, one or more inputs. Based on the inputs a contract is established between and among the parties providing governance for a DAO. A hash of the contract is generated. Cryptographic signatures are added to the hash from each party, establishing a cryptographically signed hash validating a finalized contract, the cryptographically signed hash including the hash and the cryptographic signatures. The cryptographically signed hash is provided to each of the parties. The finalized contract or an additional contract may allow the parties to purchase and sell tokens associated with the DAO using software agents. Apparatuses for facilitating DAOs are configured for performing the methods. In implementations the contract facilitates ownership and exchange of one or more nonfungible tokens (NFTs) instead of or in addition to governing a DAO.

19 Claims, 25 Drawing Sheets

(56) References Cited

U.S. PATENT DOCUMENTS

| | | | |
|---|---|---|---|
| 10,657,595 B2* | 5/2020 | de Jong | G06Q 40/04 |
| 11,170,092 B1* | 11/2021 | Liang | H04L 9/0637 |
| 11,244,032 B1* | 2/2022 | Nguyen | G06F 9/547 |
| 11,295,359 B1* | 4/2022 | Mullins | G06Q 10/0837 |
| 11,334,882 B1* | 5/2022 | Jameson | H04L 9/3231 |
| 11,410,136 B2* | 8/2022 | Cook | G06Q 20/3829 |
| 11,563,585 B1* | 1/2023 | Griffin | H04L 9/3247 |
| 11,606,219 B2* | 3/2023 | Wright | H04L 9/3239 |
| 11,625,694 B2* | 4/2023 | Wright | H04L 9/0643 705/71 |
| 2005/0182773 A1 | 8/2005 | Feinsmith | |
| 2012/0290427 A1 | 11/2012 | Reed et al. | |
| 2013/0041755 A1 | 2/2013 | Ivanov et al. | |
| 2014/0370879 A1 | 12/2014 | Redding et al. | |
| 2016/0140653 A1* | 5/2016 | McKenzie | G07F 7/082 705/69 |
| 2016/0300223 A1 | 10/2016 | Grey et al. | |
| 2016/0335533 A1* | 11/2016 | Davis | G06Q 40/08 |
| 2017/0024818 A1* | 1/2017 | Wager | H04L 9/3234 |
| 2018/0075453 A1* | 3/2018 | Durvasula | G06Q 20/3678 |
| 2018/0205555 A1* | 7/2018 | Watanabe | H04L 9/3226 |
| 2018/0241546 A1* | 8/2018 | Leng | G06Q 20/02 |
| 2018/0315046 A1* | 11/2018 | Joao | G06Q 20/322 |
| 2018/0322597 A1* | 11/2018 | Sher | G06Q 50/163 |
| 2019/0026821 A1* | 1/2019 | Bathen | G06Q 40/00 |
| 2019/0050855 A1* | 2/2019 | Martino | G06F 16/182 |
| 2019/0081793 A1* | 3/2019 | Martino | H04L 9/0894 |
| 2019/0130368 A1* | 5/2019 | Li | G06Q 20/4016 |
| 2019/0188701 A1 | 6/2019 | Parsons et al. | |
| 2019/0207770 A1* | 7/2019 | Zhou | H04L 9/3239 |
| 2019/0253240 A1* | 8/2019 | Treat | H04L 9/3297 |
| 2019/0273739 A1* | 9/2019 | Pemmaraju | H04L 63/0884 |
| 2019/0279215 A1* | 9/2019 | Kuchar | G06Q 20/0655 |
| 2019/0287175 A1* | 9/2019 | Hill | G06Q 40/04 |
| 2019/0303887 A1* | 10/2019 | Wright | H04L 9/0861 |
| 2019/0303920 A1* | 10/2019 | Balaraman | H04L 67/1042 |
| 2019/0303942 A1* | 10/2019 | Balaraman | H04L 9/3239 |
| 2019/0305938 A1* | 10/2019 | Sandberg-Maitland | H04L 9/085 |
| 2019/0363874 A1* | 11/2019 | Shirley | G06Q 20/3827 |
| 2019/0370791 A1* | 12/2019 | Stark | G06Q 20/3678 |
| 2019/0370813 A1* | 12/2019 | Bravick | G06Q 20/02 |
| 2019/0375373 A1* | 12/2019 | Pepe | H04M 1/724098 |
| 2020/0013046 A1* | 1/2020 | Joao | G06Q 20/02 |
| 2020/0019864 A1* | 1/2020 | Gu | G05B 19/4183 |
| 2020/0027089 A1* | 1/2020 | Kuchar | G06Q 20/3821 |
| 2020/0058023 A1 | 2/2020 | Travizano et al. | |
| 2020/0067907 A1* | 2/2020 | Avetisov | H04L 67/133 |
| 2020/0084051 A1 | 3/2020 | Bessonov et al. | |
| 2020/0117690 A1* | 4/2020 | Tran | G06F 16/90332 |
| 2020/0132737 A1* | 4/2020 | de Hoog | H02J 3/38 |
| 2020/0151709 A1* | 5/2020 | Bryan | G06Q 40/08 |
| 2020/0193425 A1* | 6/2020 | Ferenczi | H04L 9/3218 |
| 2020/0193429 A1* | 6/2020 | Babar | H04L 9/3239 |
| 2020/0219089 A1* | 7/2020 | Crumb | G06Q 10/10 |
| 2020/0272619 A1* | 8/2020 | Alferov | H04L 9/3297 |
| 2020/0327609 A1* | 10/2020 | Dubrofsky | G06Q 40/06 |
| 2020/0356689 A1* | 11/2020 | McEnroe | G06F 21/6218 |
| 2021/0004807 A1* | 1/2021 | Joao | G06Q 20/4015 |
| 2021/0027289 A1* | 1/2021 | Guo | H04L 9/3247 |
| 2021/0042823 A1* | 2/2021 | McClelland | G06Q 40/04 |
| 2021/0044976 A1* | 2/2021 | Avetisov | G06F 21/64 |
| 2021/0073913 A1* | 3/2021 | Ingargiola | H04L 67/104 |
| 2021/0075610 A1* | 3/2021 | Covaci | H04L 9/3093 |
| 2021/0118265 A1* | 4/2021 | Joao | G07F 17/3288 |
| 2021/0165890 A1* | 6/2021 | Schvey | G06F 21/6218 |
| 2021/0166312 A1* | 6/2021 | Dakshi | G06Q 40/04 |
| 2021/0174432 A1* | 6/2021 | Gonnaud | G06Q 20/401 |
| 2021/0209684 A1* | 7/2021 | Foote | G06Q 20/0655 |
| 2021/0250812 A1* | 8/2021 | Caswell | H04L 45/44 |
| 2021/0256070 A1* | 8/2021 | Tran | G06F 16/90332 |
| 2021/0297262 A1* | 9/2021 | Fang | G06F 9/45558 |
| 2021/0306133 A1* | 9/2021 | Mathew | H04L 9/3297 |
| 2021/0319895 A1* | 10/2021 | Joao | G06F 16/182 |
| 2021/0320806 A1* | 10/2021 | Boudreault | H04L 9/3242 |
| 2021/0326872 A1* | 10/2021 | Robotham | G06Q 20/401 |
| 2021/0326974 A1* | 10/2021 | Leng | H04L 9/0825 |
| 2021/0342803 A1* | 11/2021 | Yoo | G06Q 20/102 |
| 2021/0350458 A1* | 11/2021 | Gaur | G06Q 40/02 |
| 2021/0357870 A1* | 11/2021 | Joao | H04N 7/15 |
| 2021/0382620 A1* | 12/2021 | Fang | G06F 16/9024 |
| 2021/0382831 A1* | 12/2021 | Sun | G06F 16/2315 |
| 2021/0390549 A1* | 12/2021 | Rule | G06Q 20/4016 |
| 2022/0028005 A1* | 1/2022 | Le | G06Q 30/0213 |
| 2022/0058282 A1* | 2/2022 | Ricotta, Jr. | G16H 10/20 |
| 2022/0101326 A1* | 3/2022 | Kim | H04L 63/0464 |
| 2022/0278859 A1* | 9/2022 | Mackay | H04L 9/0643 |
| 2022/0335553 A1* | 10/2022 | Chew | G06F 16/35 |
| 2023/0422030 A1* | 12/2023 | Perez Martinez | H04L 9/50 |
| 2024/0086901 A1* | 3/2024 | Moreira | G06Q 20/367 |

OTHER PUBLICATIONS

"Microledger, its importance in the world of crypto," published Apr. 20, 2022, available online at https://www.coingabbar.com/en/crypto-blogs-details/microledger-its-importance-in-the-world-of-crypto, retrieved and last visited Jun. 17, 2024.

"Decentralized Identifiers (DIDs) v1.0: Core architecture, data model, and representations," published online by W3C Jul. 19, 2022, available online at https://www.w3.org/TR/vc-data-model/, retrieved and last visited Jun. 19, 2024.

JLINC Protocol Summary, published online by applicant at least as early as 2018, available online at https://jlinc.org/, retrieved and last visited Jun. 19, 2024.

Detailed JLINC Protocol, published online by applicant at least as early as Mar. 26, 2020, available online at https://protocol.jlinc.org/, retrieved and last visited Jun. 19, 2024.

JLINC Schema, published online by applicant at least as early as Feb. 12, 2019, available online at https://protocol.jlinc.org/schema/, retrieved and last visited Jun. 19, 2024.

JLINC DID Method Specification, published online by applicant at least as early as Oct. 12, 2018, available online at https://did-spec.jlinc.org/, retrieved and last visited Jun. 19, 2024.

"Verifiable Credentials Data Model v1.1," published online by W3C at least as early as Mar. 3, 2022, available online at https://www.w3.org/TR/vc-data-model/, retrieved and last visited Jun. 19, 2024.

"My first impressions of web3," published online at least as early as Jan. 7, 2022, available online at https://moxie.org/2022/01/07/web3-first-impressions.html, retrieved and last visited Jun. 19, 2024.

"Hash Function," Published online by Wikipedia at least as early as May 30, 2020, available online at https://en.wikipedia.org/w/index.php?title=Hash_function&oldid=959841170, retrieved and last visited Jun. 16, 2022.

Sotos, J. et al., Blockchains for Data Sharing in Clinical Research: Trust in a Trustless World, Intel, Santa Clara, CA, USA, Blockchain Application Note #1, published May 2017 < URL: https://simplecore.intel.com/itpeernetwork/wp-content/uploads/sites/38/2017/05/Intel_Blockchain_Application_Note1.pdf > [2].

Arenas, A. E., "An Event-B approach to Data Sharing Agreements", 8th International Conference on Integrated Formal Methods (IFM 2010), Nancy, France, published 2010 < URL: https://epubs.stfc.ac.uk/manifestation/48912666/STFC-AAM-2021-008.pdf > [2].

Matteucci, I. et al, "CNL4DSA: a controlled natural language for data sharing agreements", Proceedings of the 2010 ACM Symposium on Applied Computing, published 2010 < URL: https://www.researchgate.net/profile/Marco-Sbodio/publication/221001628_CNL4DSA_A_controlled_natural_language_for_data_sharing_agreements/links/0912f50a3602c606dd000000/CNL4DSA-A-controlled-natural-language-for-data-sharing-Agreements.pdf > [2].

* cited by examiner

FIG. 3

| My Standard GDPR Permissions | |
|---|---|
| Content Permission | |
| Brand Marketing > | ON |
| Product Marketing > | off |
| New Product Marketing > | ON |
| Discount Offers > | off |
| Partner Offers > | off |
| Customer Research > | off |
| Newsletter > | ON |
| Membership > | off |
| Volunteering > | off |
| Fundraising > | off |
| Data Sharing Permission | |
| Sharing Data within Group > | off |
| Sharing Data with Partners > | off |
| Data Purpose Permission | |
| Automated Decision Making > | off |
| Location Tracking > | off |
| Online Tracking > | off |
| Data Management Permission | |
| Cross-Border Transfers > | off |

FIG. 5

```
# INFORMATION SHARING AGREEMENT
STANDARD ISA FOR 2 PARTY AGREEMENTS

1   TABLE OF CONTENTS
2   STANDARD INFORMATION SHARING AGREEMENT (SISA)

2.1   PREAMBLE
2.2   TERMS AND DEFINITIONS
2.3   SUBJECT MATTER OF THIS INFORMATION SHARING AGREEMENT
2.4   CONFIDENTIALITY AND PRIVACY
2.5   SECURITY
2.6   DATA PROCESSING TRANSPARENCY
2.7   INCIDENT AND BREACH NOTIFICATION AND MANAGEMENT
2.8   COMPLETE PERSONAL DATA LIFE CYCLE
2.9   RETURNING OR DESTRUCTION OF PERSONAL DATA
2.10  LIABILITY AND INDEMNITY
2.11  DURATION AND TERMINATION
2.12  PRIVACY OF THE SISA
2.13  ELECTRONIC SIGNATURE

3   APPENDICES
3.1   NOTICE TO USERS
3.2   STANDARD INFORMATION SHARING AGREEMENT SUMMARY
2   STANDARD INFORMATION SHARING AGREEMENT (SISA)

Between:
The rights holder, the entity or natural person setting out the permissions for the processing of personal data. The rights holder shall be either the natural person whose personal data is the subject of this agreement or will be a natural person or entity whose authority to set out the permissions for the processing of personal data is derived from the natural person whose data is being processed or an equivalent legal authority (hereinafter to be referred to as the "Rights Holder"),
And The data custodian, a company, or other legal entity operating under the legal name specified, and incorporated or organized under the laws of the country specified, having its registered office and principal place of business at the address specified, and registered with the appropriate governmental authority using the appropriate identifying number specified, where all of the forgoing information has been accurately specified though the JLINC software (hereinafter to be referred to as the "Data Custodian"),
Hereby agree as follows:
```

FIG. 12A

2.1 PREAMBLE
The purpose of this JLINC Standard Information Sharing Agreement is to enable personal data processing to proceed with the ongoing knowledge, consent (where allowable by law) and control of the natural person whose personal data is being processed in the context of the terms, conditions, and policies established by the Data Custodian. This is accomplished by the various means as described below, and as implemented by software and systems that conform to the JLINC protocol.

By entering into this agreement, both parties agree to process personal data as directed by the Rights Holder, and to ensure that any information sharing agreements entered into with other parties will enforce these terms.

2.2 TERMS AND DEFINITIONS
Authority for Processing: An underlying assumption in the JLINC suite of protocols and software is that the Data Custodian will not process any data from the Rights Holder without some form of authority, such as consent, received from the Rights Holder directly or derived from a contractual, regulatory, or legal obligation that is binding on the Data Custodian.

Data Custodian: This is the entity that is processing data as received from and/or as directed by the Rights Holder.

Data Processing: The Rights Holder and the Data Custodian shall jointly determine the scope, purposes, and manner by which Personal Data may be collected, used, disclosed, retained, or disposed of by the Data Controller Custodian or any subsequent Data ProcessorCustodian, where not otherwise required by regulation, the determination of allowable data processing will be asserted by the Rights Holder through the JLINC protocol and this SISA. This may be referred to as 'processing' or 'processed' in the body of the document below.

JLINC protocol: The technical specification for implementing permissioned data as set out in the JLINC (protocol) (https://protocol.jlinc.org/) specification and [API documentation](https://jlinclabs.github.io/apidocs/).

JLINC software: The suite of protocols, software and web services that implement the JLINC Protocol.

Personal Data: Information about a natural person. At implementation of the JLINC software Personal Data shall be deemed to be that information about people that is protected by the privacy legislation that applies to the Data ControllerCustodian. In the absence of such legislation, the General Data Protection Regulation shall be deemed to be the applicable legislation for the definition of Personal Data.

Privacy Legislation: At implementation of the JLINC software this shall be the privacy legislation that applies to the Data Controller in the jurisdiction where the Data Controller collects the Personal Data. In the absence of such legislation, the General Data Protection Regulation shall be deemed to be the applicable legislation.

Rights Holder: This is the entity that supplies data and/or permissions to the Data Custodian to enable the Data Custodian to process that

FIG. 15

APPARATUSES AND METHODS FOR FACILITATING CRYPTOGRAPHICALLY MEDIATED ORGANIZATIONS AND TOKENS AND RELATED INTERACTIONS

CROSS REFERENCE TO RELATED APPLICATIONS

This document claims the benefit of the filing date of U.S. Provisional Patent Application No. 63/175,925, entitled "Method for Creating Cryptographically Mediated Organizations and Tokens," naming as first inventor James Fournier, which was filed on Apr. 16, 2021, the disclosure of which is hereby incorporated entirely herein by reference.

BACKGROUND

1. Technical Field

Aspects of this document relate generally to blockchains, contracts, smart contracts, and decentralized autonomous organizations (DAOs).

2. Background Art

A blockchain is a list of records or "blocks" cryptographically linked together using cryptography, each block including a cryptographic hash of the previous block, a timestamp, and transaction data. A contract is a legally enforceable agreement that creates, defines, and governs mutual rights and obligations among parties. A smart contract is a computer program or transaction protocol intended to automatically execute, control or document legally relevant events and actions according to terms of a contract or agreement. A smart contract may for example be a collection of code and data deployed using cryptographically signed transactions on a blockchain. A decentralized autonomous organization (DAO) is an organization represented by rules encoded as a computer program and is controlled by organization members—in other words a member-owned community, without centralized leadership, whose financial transaction record and program rules are maintained on a blockchain.

SUMMARY

Implementations of methods for facilitating decentralized autonomous organizations (DAOs) may include: using one or more computer processors: receiving, from each of a plurality of parties, one or more inputs; based on the one or more inputs, establishing a contract between and among the parties, wherein the contract provides governance for a decentralized autonomous organization (DAO); generating a hash of the contract; adding cryptographic signatures to the hash from each of the parties, thereby establishing a cryptographically signed hash which validates a finalized contract, wherein the cryptographically signed hash includes the hash and the cryptographic signatures; and providing the cryptographically signed hash to each of the parties.

Implementations of methods for facilitating decentralized autonomous organizations (DAOs) may include one or more or all of the following:

The finalized contract may include a contextual serialization of data required to move data between separate data stores.

The step of receiving the one or more inputs from each of the parties may include receiving the one or more inputs from software agents of the parties, the software agents configured for automated cryptographically signed interactions.

The method may further include processing one or more actions initiated automatically by one of the software agents in response to one or more actions of another of the software agents.

The finalized contract may facilitate smart voting whereby one of the parties programs its software agent to follow, or delegate a proxy vote to, another of the parties or any combination of the parties.

The finalized contract may be human readable and legally enforceable.

The method may further include providing the cryptographically signed hash to an immutable log, an immutable ledger, a blockchain, and/or any combination thereof, to provide auditable proof of the finalized contract.

The DAO may be an interoperable autonomous agent-based organization (IABO).

The finalized contract may not be self-executing but may be self-validating and non-repudiable.

The method may further include providing a signed hash of every transaction associated with the DAO to a superset of all audit trail locations provided by the parties, the audit trail locations including an immutable log, an immutable ledger, a blockchain, and/or any combination thereof.

Implementations of methods for facilitating decentralized autonomous organizations (DAOs) and associated tokens may include: using one or more computer processors: receiving, from each of a plurality of parties, one or more inputs; based on the one or more inputs, establishing a contract between and among the parties, wherein the contract provides governance for a decentralized autonomous organization (DAO); generating a hash of the contract; adding cryptographic signatures to the hash from each of the parties, thereby establishing a cryptographically signed hash which validates a finalized contract, wherein the cryptographically signed hash includes the hash and the cryptographic signatures; providing the cryptographically signed hash to each of the parties; wherein the finalized contract and/or an additional contract allows the parties to purchase and sell tokens associated with the DAO using software agents of a purchasing party and a selling party.

Implementations of methods for facilitating decentralized autonomous organizations (DAOs) and associated tokens may include one or more or all of the following:

The additional contract may be between one of the parties and the DAO.

The additional contract may be between two or more of the parties.

The method may further include identifying the purchasing party using a decentralized identifier (DID).

The method may further include the software agents of the purchasing party and the selling party each sending cryptographic signatures over a hash associated with a token sale to one or more immutable repositories, the one or more immutable repositories including an immutable log, an immutable ledger, a blockchain, and/or any combination thereof.

The one or more immutable repositories may include all immutable repositories specified by the parties who own tokens.

The tokens may be commodity index tokens (CITs) whose value is pegged to one or more indices of commodity prices.

The tokens may be commodity asset tokens (CATs) whereby proceeds from a token sale are invested by purchasing one or more commodities, one or more commodity options, one or more commodity futures, one or more commodity spot trades, and/or any combination thereof.

The tokens may be one or more non-fungible tokens (NFTs).

Implementations of methods for facilitating nonfungible token (NFT) ownership and exchange may include: using one or more computer processors: receiving, from each of a plurality of parties, one or more inputs; based on the one or more inputs, establishing a contract between and among the parties, wherein the contract facilitates ownership and exchange of one or more nonfungible tokens (NFTs); generating a hash of the contract; adding cryptographic signatures to the hash from each of the parties, thereby establishing a cryptographically signed hash which validates a finalized contract, wherein the cryptographically signed hash includes the hash and the cryptographic signatures; and providing the cryptographically signed hash to each of the parties; wherein the finalized contract and/or an additional contract allows the parties to purchase and sell the one or more NFTs using software agents of a purchasing party and a selling party.

Implementations of an apparatus for facilitating decentralized autonomous organizations (DAOs) may include: one or more servers, including one or more computer processors, configured to: receive, from each of a plurality of parties, one or more inputs; based on the one or more inputs, establish a contract between and among the parties, wherein the contract provides governance for a decentralized autonomous organization (DAO); generate a hash of the contract; add cryptographic signatures to the hash from each of the parties, thereby establishing a cryptographically signed hash which validates a finalized contract, wherein the cryptographically signed hash includes the hash and the cryptographic signatures; and provide the cryptographically signed hash to each of the parties.

General details of the above-described implementations, and other implementations, are given below in the DESCRIPTION, the DRAWINGS, the CLAIMS and the ABSTRACT.

BRIEF DESCRIPTION OF THE DRAWINGS

Implementations will be discussed hereafter using reference to the included drawings, briefly described below, wherein like designations refer to like elements. The drawings are not necessarily drawn to scale.

Figure 3:
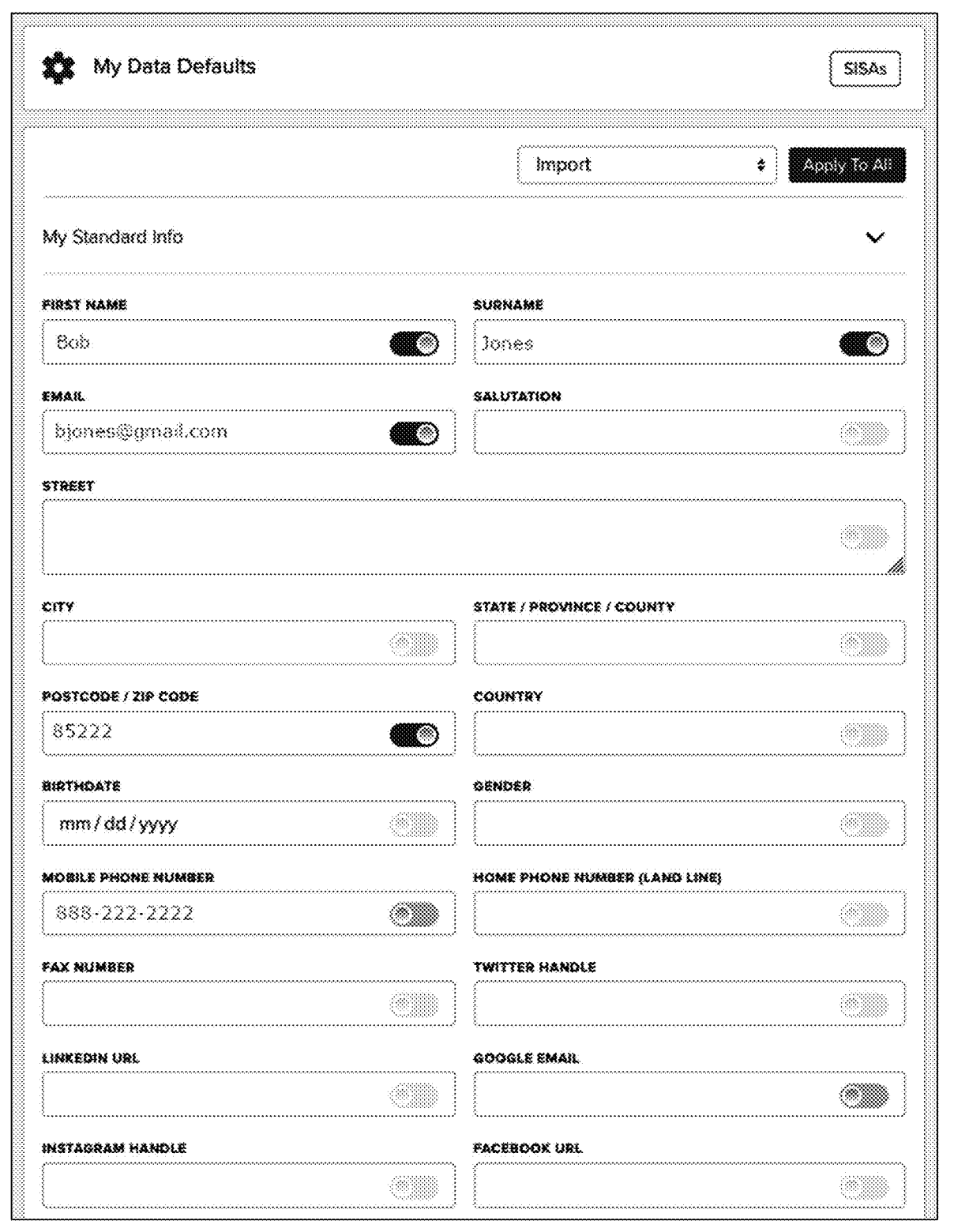

FIG. 3 is an example user interface implemented using the system of FIG. 1;

FIG. 5 is an example user interface implemented using the system of FIG. 1;

FIG. 12A is a portion of an example user interface implemented using the system of FIG. 1;

FIG. 12B is another portion of the example user interface of FIG. 12A;

FIG. 14 is an example user interface implemented using the system of FIG. 1;

FIG. 15 is an example user interface implemented using the system of FIG. 1;

DESCRIPTION

Figure 1:
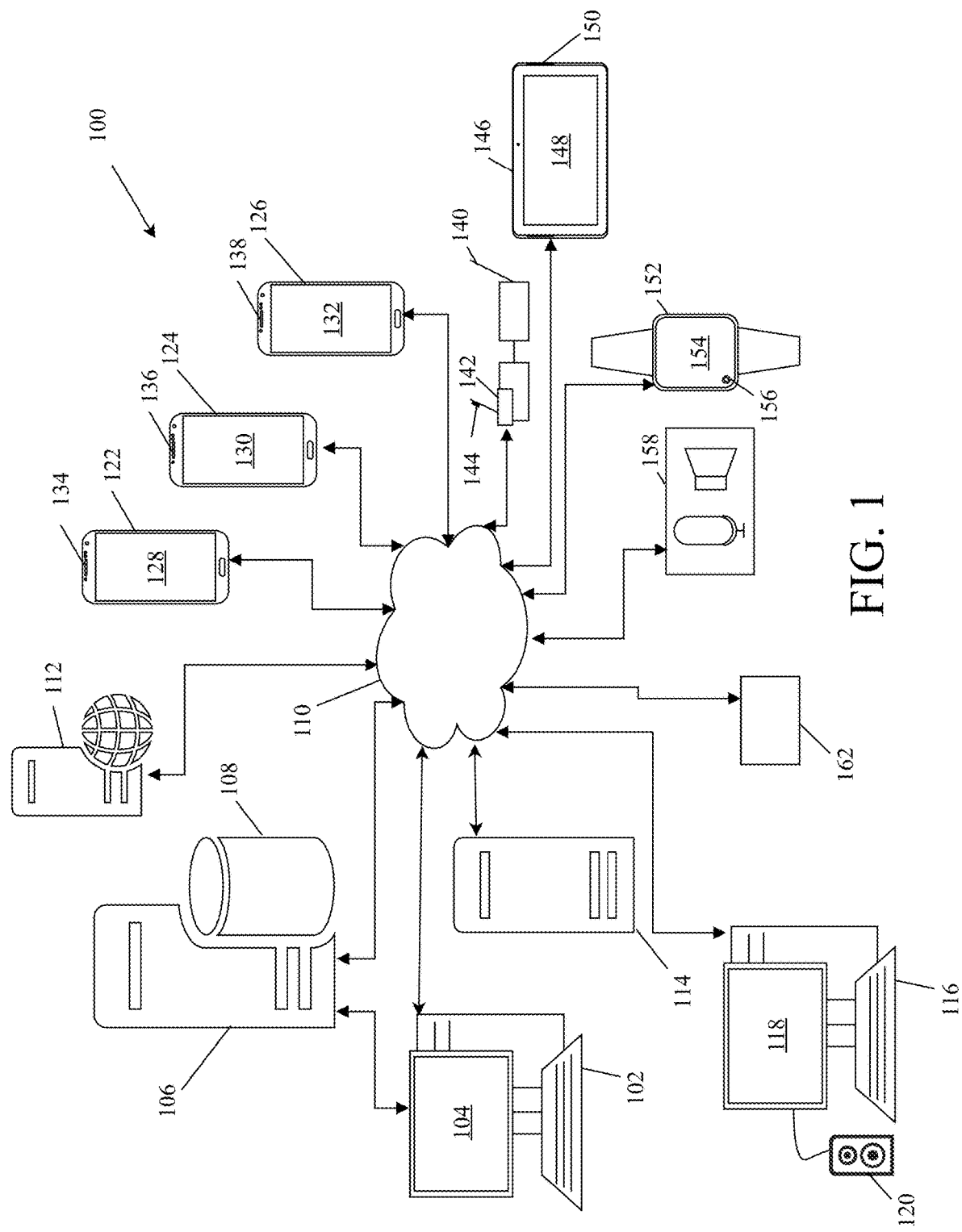
FIG. 1 is a diagram view of an implementation of a system for facilitating decentralized autonomous organizations (DAOs) and associated tokens and for facilitating nonfungible token (NFT) ownership and exchange.

Implementations/embodiments disclosed herein (including those not expressly discussed in detail) are not limited to the particular components or procedures described herein. Additional or alternative components, assembly procedures, and/or methods of use consistent with the intended apparatuses and methods for facilitating cryptographically mediated organizations and tokens and related interactions may be utilized in any implementation. This may include any materials, components, sub-components, methods, sub-methods, steps, and so forth.

If one looks at the evolution of cryptographically signed monetary vehicles there are good reasons why things have developed as they have. Existing "crypto currency" rests on a handful of technological innovations that also made the token-based DAOs (Decentralized Autonomous Organizations) possible. The first is the existence of the Internet itself, a network of computers connected in a way that allows multiple parties to be connected essentially anonymously. The second is the cryptographic "hash," a way of operating on and transforming any digital object into a unique string of characters of a pre-determined length. The third is convenient standard public-private key cryptography (PKI). This allows interactions to be signed with secret private "keys" held by the owner. These interactions or transactions can then be identified based on the persistent public key associated with them. This is really at the heart of "crypto," and various other innovations can be added. The fourth is the digital ledger, a list of debit and credit transactions in a sequence, recorded in electronic form.

Then the fifth innovation, which made the BITCOIN blockchain possible, was the proof-of-work algorithm whereby a computer can do some work, literally in the thermodynamic sense, to solve a cryptographic puzzle (or in other words a complex computational math problem) to earn the right to record the next cryptographic hash onto a digital ledger. This also allowed the ledger to be "distributed" across a number of different nodes connected to a network, each competing for the right to record the next hash to the ledger. That innovation, combined with the previous pieces, made the "blockchain" possible and set off what has become the crypto revolution.

There are other possible ways to determine which entity can record the next hash to a distributed ledger. The most widely known alternative is "proof-of-stake" where the entities must assert proof of standing in a network, generally based on ownership of tokens that they already hold. Yet another alternative is a "permissioned" ledger, where instead of a collection of anonymous nodes with zero trust, the nodes represent parties within a community of known entities connected by a network.

The property that all of these methods have in common is that they are each based on a consensus mechanism whereby the global network can automatically arrive at eventual consistency of the ledger record. They are distinguished by variations on consensus mechanisms, as well as by various governance models.

The initial premise of the BITCOIN blockchain is a zero knowledge and zero trust scenario where none of the parties know or trust each other and indeed where at least some of the parties would steal from and defraud the others if given the opportunity to do so—in short, the Internet. In addition, many of the initial use-cases involved at least the desire for independence from governments and banks, if not actual illegal activity.

The BITCOIN blockchain was called a digital currency because it was proposed as a way to represent monetary value that could be digitally exchanged.

The other implicit but non-obvious design property that was introduced into the BITCOIN blockchain was artificial scarcity that caps the total number of "tokens" that can be "mined" and recorded on the ledger using the proof-of-work algorithm.

This gave the token, and others that followed, a number of properties that could be associated with a currency, but which are now understood to more closely resemble a digital asset, or in many cases really a digital equity instrument.

Most "voting tokens" actually resemble alternatives to issuing a stock rather than an instrument of utility for transactions. Like money, or stock, tokens may represent a store of value, but in a volatile market that can be difficult to determine in the long-term.

Arguably, tokens, or "coins" have been very good for rapid capital formation. The liquidity of the market and absence of regulation have created a booming and volatile market for new coins issued by new entities. It is difficult to objectively assess an entity's "valuation" as its "capitalization" is computed in the same way one would compute the valuation of a company based on the price of its shares, but the business model of each entity has been based on the premise that some of the coins that it issues will have "utility" when they circulate as a representation of value in actual commercial transactions. In reality, many tokens have become speculative instruments in a bull market.

The ETHEREUM blockchain is different in so far as it introduced an additional innovation, the "self-executing" smart contract. Here the ability to add an additional computational layer to the object recorded on a ledger created additional business possibilities.

The use of the word "contract" in the ETHEREUM "smart contract" is actually significantly different than the meaning of the word in general use. A contract between two or more parties in business represents a legally binding and enforceable agreement that is written in natural language and can be adjudicated in court by a human judge. In contrast, a smart contract is a piece of executable software code that can be used to automate logical transactions and which other software applications can reference.

When a smart contract is used to create a Decentralized Autonomous Organization (DAO), which owns and controls a set of assets, the governance of that organization is carried out under a smart contract which anchors the outcome of those governance decisions on a blockchain.

The idea that an organization can be created based on a set of cryptographically signed agreements, such as a DAO based on smart contracts, gives rise to a set of questions about how democratic governance of other types of organizations could also be supported.

If that organization is, or seeks to become a legal entity, then the governance issues may also include legal contractual issues, as well as those that can be governed by automated code and the voting infrastructure provided by that code in the smart contract infrastructure.

The smart contract and all blockchain transactions are controlled by cryptographic keys held by the parties that purchase and/or own tokens on the ledger. The same keys could also be used to sign a parallel set of off-chain contractual agreements that would be legally valid and binding, if the contracts are written in natural language and then signed with cryptographic keys. To make a distinction these can be called "self-validating" legal contracts as opposed to self-executing smart contracts.

The divergence between human readable legal contracts and smart contracts based on compiled code, where the code takes precedence, actually makes ETHEREUM smart contracts incompatible with the requirements for legal contracts needed by existing institutions.

The ETHEREUM blockchain also remains a proof-of-work ledger. The ETHEREUM community has made a public decision to move to a proof-of-stake ledger over the next few years. However, the climate impact of the ETHEREUM blockchain remains an issue today, as highlighted by public concern about the carbon emissions impact of current non-fungible tokens (NFTs).

New Decentralized Autonomous Organizations (DAOS)

The possibility of recording business logic in a decentralized smart contract made the DAO possible. The core premise is that the DAO exists exclusively on a blockchain rather than as a legal entity.

The words "decentralized" and "distributed" have been used almost interchangeably to describe one of the key properties of the crypto landscape—the philosophical ideal that there is no one central point of ownership, control or authority. The ledger is distributed across many different "nodes" each running "autonomously" on different servers on the Internet.

Two things are actually decentralized, both the technology supporting the network, and the ownership and control of the network entity, where each of the participating "owners" has a vote proportional to its holding in tokens as specified under the terms of the smart contract and can exercise that democratic control over the "organization." This is the premise of a DAO. The owner investors have direct democratic control, unmediated by a board, and are also at least to some degree outside the reach of any government or governmental oversight or control.

There was another meaning of decentralized that was in use before the advent of blockchain, which is now most often called "interoperability." This means that data, content, and agreements can move between and interoperate across autonomous, heterogeneous servers at different domains on the Internet. Each of those can and often does represent an independent party for whom the ability to engage in verifiable contract-based exchange is a desirable goal. It is useful to recognize that interoperability is a slightly different problem, which has not actually been solved by distributed ledgers.

If a DAO or other decentralized organization seeks to operate as a legally constituted entity, then legal contracts are also needed in place of, or in addition to, smart contracts.

This suggests a new type of organization composed of interoperable autonomous entities that can be represented by agents. This new type of "interoperable agent-based organization" is described here as an "IABO."

An interoperable system would also require automated contracts to function, but the first property needed in those contracts would be "self-validation" rather than "self-execution."

Non-repudiation can be provided by writing to a single ledger as a canonical source of truth. However, that is not the only possible means of achieving a decentralized or distributed system of non-repudiable automated contracts.

In the crypto world the idea that each party has cryptographic keys is now foundational. The metaphor that has become standard is that one has a "wallet" to hold keys that represent the ownership of tokens or coins on ledgers. Those keys can also be used to sign transactions or agreements, including voting under the terms of a smart contract.

Because the ETHEREUM blockchain evolved from the BITCOIN blockchain and the ownership and business model assumed the existence of a token-based distributed ledger, the entire crypto world has come to see things through that lens. However, cryptographic keys are fundamentally simply a mechanism that facilitates "agency." They allow the possessor to execute an action or assert ownership or control.

Once one understands that the autonomous individuals on a digital network each have agency, and therefore identity, represented by keys, the next logical step is to posit an "agent" that can act on behalf of each party to use their keys to sign contracts.

If the keys are used for complex voting and control, such as is required in a DAO, or IABO, it would make sense that each party to that shared contract might need their own agent capable of automated actions in response to the actions of other parties and their agents, and that an automated digital exchange layer that could support those cryptographically signed interactions would be exceedingly useful, and possibly essential.

If the contracts can also be held and signed by those agents, then the situation actually closely reflects the traditional business logic where each party to a contract holds a copy of the contract signed by the other party or parties to the agreement. The contract can be signed by each of the parties, and exchanged with the other parties, and then a signed hash of that can simply be sent to a ledger to provide audit proof.

In this scenario, where a defined set of parties sign contractual legal agreements, a global consensus mechanism is not actually needed, and could in fact become an impediment. All that is required is that each party to the contract have a copy of the contract signed by all other parties to that contract in a non-repudiable self-validating way.

Indeed, if each party sends a signed hash of every transaction to the superset of all audit trail locations specified by any of the parties, each party can make their own decision about the level of assurance that must be provided by their own audit record to prove the validity of the contracts that they hold with other parties. No elaborate cryptography beyond simple well-proven PKI is required to sign and manage contracts.

If the contracts are written in a graph data language, such as JSON-LD, then the contracts themselves can actually describe the contextual serialization of data required to move data between separate data stores (such as databases) at separate domains. And because JSON is human readable, existing legally valid contracts can be automated in a manner that can remain legally binding. In case of a dispute a judge can read the contract and render an opinion. At the same time, the contracts are also fully transparent because any party to the agreement can read and inspect the terms in the actual code, rather than a human-readable interpretation derived from the code.

Additional automated business logic for a "smart contract" on a ledger can be signed with the same keys if the parties wish to create a self-executing contract in addition to the self-validating contract that provides verification and non-repudiability of a mutually signed agreement.

The interoperable agent-based organization (IABO) is a contract among an autonomous set of individual parties that can exist in a digital form. If each party runs its own agent, not only is the system truly decentralized, it is actually interoperable as well.

The IABO is similar to current DAOs, but based on contracts written in JSON-LD, signed with standard PKI and held by agents representing each of the parties, where a signed hash of each signed transaction is sent to an audit repository, which could be on the ETHEREUM blockchain, or any other distributed ledger, but could also simply reside on any third-party append-only ledger or time-series database.

When you strip away all of the assumptions, it turns out that you don't need a monetized token to run an IABO. In fact, it may be a lot simpler, cheaper, safer, and more democratic and transparent to simply run it on a set of autonomous agents representing the parties.

Indeed, even if a DAO is represented on a decentralized ledger, the parties may still need a layer of connected agents capable of automated cryptographically signed interactions in order to function most effectively in a fully democratic fashion together.

Money in Theory

Now let us turn our attention to the question of money and tokens.

One of the principal goals of the crypto world is to replace fiat money with cryptographic tokens. Because the whole movement was first inspired by the BITCOIN blockchain that created ostensibly monetary tokens recorded on a distributed ledger, that has become the foundational template and core assumption.

To think about this with a beginner's mind it might be useful to go back to first principles.

Money is classically described as a method to fulfill 3 functions:
 1. A measure of value
 2. A store of value
 3. A means of exchange There are a number of problems with fiat-based money:
 1. It is centrally issued and controlled
 2. It is borrowed into existence with interest due 3. It gives selected banks a monopoly on borrowing at the lowest cost
4. It lacks a benchmark value anchored to anything tangible, such as gold The justification of the need for central control is that without it the money supply will be inflated and thereby devalued, but even with that control there is some level of inflation.

There are also good arguments that using any single commodity, such as gold, introduced scarcity that dangerously constrained real growth in the economy.

The Terra Currency

An economist named Bernard Lietaer proposed a currency called the "TERRA" currency that would represent a highly inflation resistant measure of value, and therefore a very good store of value. He proposed that a standard "basket" of commodities could be calculated from an index of commodity prices, for example an ounce of gold, a bushel of wheat, a barrel of oil, a kWh of electricity, etc. The TERRA currency could actually be represented as a set of warehouse receipts for that basket.

A ledger can define debits and credits in any unit, so one could theoretically create a virtual token measured in TERRA units and record transactions on a ledger based on that measure of value. However, it is not immediately clear how that unit would work with other existing crypto tokens because the whole point of a TERRA currency would be to establish a benchmark that is not subject to speculative fluctuations, but instead provides a truly stable benchmark of value—the pure measure of value function of money.

If one created a TERRA token by purchasing the underlying commodities to back it, instead of appreciation it might actually carry a demurrage charge because the underlying physical commodities all have storage costs and the right to own them as a hedge against volatility would actually require a security fee, a negative interest charge, similar to holding U.S. Treasuries at the height of the 2008 economic crisis.

However, if one wanted to create an autonomous DAO, or IABO, simply using TERRA currency as the pricing benchmark for a virtual token in a contract would be more independent of currency fluctuations and financial markets than so-called "stable coins"— which are actually based on fiat currencies with an additional layer of speculative noise and cost resulting from writing a coin to a proof-of-work ledger.

Questioning Assumptions

If an IABO is an autonomous digital entity, what are the minimum requirements for a token that it creates in order to exist? The token is a representation of ownership in the organization. This is an agreement among the parties that can also be resold to future parties and which can appreciate based on the perceived value of the organization. It much more closely resembles a stock than a currency, at least according to the Internal Revenue Service (IRS).

As a non-limiting example, one can write a contract that starts as a convertible note, simple agreement for future equity (SAFE), share purchase agreement or token, possibly denominated in TERRA currency instead of a fiat currency if one wants to be independent of centralized currency, with the participants in the IABO each registering its ownership of equity and governance with each other's agents under the terms specified, and each then sending a signed hash of that to all agreed-upon ledgers or MERKLE-TREE type distributed repositories such as INTERPLANETARY FILE SYSTEM (IPFS) or HYPERCORE.

The act of contractually exchanging anything of any value for a ledger entry under the shared contract, identified by its hash value, is the purchase of the token. The token is a measurement of the relative value of one thing compared to another: a U.S. dollar, a British pound, a bushel of wheat, a kWh of solar output, etc. The token simply records that entry of a credit in a ledger under the terms of a contact agreed to and signed by each of the parties at an agreed exchange rate. Then each of the parties to the shared contact owns a defined number of units, shares, tokens, etc. in the organization. If the value of the organization increases, the unit holders each own proportionally more value, subject to any terms governing differences in relative value of different defined classes of units, liquidation preferences, etc.

One innovation, but many would argue deception, of the initial token-based business model was the assumption that the equity unit created by investing in a token will also have "utility" value in a business model wherein the customers of the entity would be motivated to purchase tokens for the purpose of engaging in commerce and that the tokens thereby have utility value.

This conflation of equity capital appreciation with a monetary exchange vehicle for a business was largely an artifact of the assumption that the BITCOIN blockchain has utility as a currency. This also fueled claims about the exemption of token sales from securities laws.

Many token-based ledgers now issue two different tokens, where one is a "voting" token that is essentially a security, and the other is some form of utility token that is meant to remain as stable as possible to allow customers to interact with a business.

If one were to simply create an organization based on a cryptographically signed automated contractual agreement, then the structure might be more legally sound.

The challenge is that while the voting tokens do most often more closely resemble a security than a currency, organizations want those tokens to be easily sold and traded directly between parties without being constrained by the regulated securities market infrastructure.

In reality, the tokenized world has reinvented exchanges where tokens must be listed in order to be traded and those exchanges are now beginning to be regulated.

There are other potential benefits of a IABO structure, particularly one where the members of the IABO include a network of legal entities which are not natural people, and where the ability of the IABO to represent legally binding contractual agreements between the parties becomes important. The ability to operate under legally-binding agent-based agreements also makes other business structures and utility possible.

Each of the parties, which could also include other stakeholders that the owners designate, can engage in voting and polling. Complex automated "smart voting" is also possible where any party could program its automated agent to follow, or delegate its proxy to, any other party, or combination of parties, in different contexts.

Commodity Index Tokens

One big challenge now facing the crypto world is how to actually create stable tokens. There are existing so-called "stable coins" which represent various fiat currencies on blockchains. However, the benefit of these stable coins has largely been limited to providing a trading mechanism to collateralize loans to purchase tokens, or to move assets out of volatile crypto currencies into a more stable representation of a "hard currency" valuation within crypto currency exchanges.

One can instead create a pure "commodity index token" (CIT) pegged to a meta-index of all publicly traded commodity price indices, where a pure measure of value index is thereby derived and used as a benchmark to "price" all other fiat currencies and crypto tokens. This pure "TERRA token" (TT) could be used as the pricing unit in contracts, including to establish the price of tokens purchased by contributing any other token, fiat currency or commodity to a DAO or IABO asset pool and therefore also to establish and report the value of a DAO or IABO.

Alternatively, one could instead create a "commodity asset token" (CAT) by investing the proceeds from the sale of the token in the actual purchase of a defined set of commodities. The resulting CAT functions as an "ultra stable coin." The actual vehicle is a contract that records each token purchase and applies those funds to acquire the ownership rights to the specified mix of hard assets proportional to the value of the tokens purchased.

A CAT could be sold by a DAO, or an IABO, which issues tokens, or human-readable and therefore legally binding, non-repudiable, cryptographically signed contracts in the form of tokens that verify purchase.

Each of these "secure contracts" is held by the purchaser's automated software "agent" and a copy is also sent to the automated agents representing each of the other token holders in the IABO, so that every party has a copy of the contract with each purchaser, showing their public key, but not necessarily their real identity. The updated contracts always refer to the current ledger held by the IABO, listing the total funds invested in the IABO, the total commodities held, and the portion of those assets attributed to each token in the IABO.

The contracts are cryptographically signed using private keys held by each purchaser, by the automated agent representing the IABO and by the agents representing each of the token owners in the IABO. At each transaction each agent that is a party to that transaction also sends a signed hash to an audit ledger specified by each party that holds a token and to a reference ledger on a MERKLE-TREE type implementation such as HYPERCORE, IPFS, or any other ledger designated by the IABO. Each party thereby holds a token representing a fractionally indexed market basket of commodities.

The purchase price of the token includes cost of the physical commodity assets. Token ownership also requires paying maintenance costs for the storage of the physical assets, as well as a share of the administrative costs associated with maintaining the IABO. Accordingly, the total number of tokens held shrinks by a tiny percentage each period as specified in the contract. This results in the equivalent of a negative interest rate, or demurrage charge for holding real, inflation-resistant liquid assets.

While the tradable token measured in its own underlying commodity index units might shrink very slightly, its value measured in so-called hard currencies might actually rise sharply, as it is simply a measure of the aggregate value of "real" commodities relative to the supply of fiat money being issued by central banks.

The CAT is a hedge against inflation, volatility and loss of value. It allows token holders to purchase an instrument that is stable against not only volatility in the crypto market, but also against inflation and resulting effective devaluation in fiat currency values, volatility in currency exchange rates and economic turmoil in general.

The secure contract infrastructure used to implement the CAT financial instrument is entirely auditable and human-readable, so it is also compatible with the conventional financial system and the needs of enterprise corporations. This additional base of potential purchasers supports greater adoption and therefore liquidity for the token in conventional financial markets and portfolios.

Those entities that actually hold commodities which represent components of the CAT can contractually pledge those assets to the IABO in exchange for the purchase of CATs where that purchase price is paid in the component commodity pledged. Those entities also earn maintenance cost income for performing the storage function of that component commodity under the terms of the standard contract.

More than one possible CAT "distribution" of commodities is possible. Indeed, achieving an absolute distribution that accurately reflects a theoretical meta-index of all publicly traded commodities would be exceedingly difficult if not impossible as a practical manner, so any CAT would need to choose some defined subset of all commodities to own.

On one hand, the primary goal of the CAT is to provide a stable hedge against inflation and instability. On the other hand, a diversified purchase of actual commodities could itself represent a stabilization of commodity prices, or even a price support under certain circumstances if the scale of CAT activity were sufficiently large. A CAT that was constructed in part as a selective investment vehicle could also potentially return other additional benefit on that basis, or even exert a force on the direction of industrial policy.

For example, in an era when society is under pressure to decarbonize rapidly, a CAT could make an intentional decision to exclude fossil fuel assets from the CAT, even though they still represent a sizable share of the commodity market. Would such a decision outperform or underperform a CAT that included them over time? Would a CAT that excluded fossil fuel assets be necessary for individuals, families and institutions that make corporate social responsibility (CSR) commitments to divest from fossil fuels? Other portfolio screens could pose parallel questions to those already faced by portfolio managers who must balance traditional diversification across an entire index of existing equities vs. the performance of a screened portfolio selection that does not reflect a pure index. Research is showing that in many cases the screened portfolios are outperforming broad indexes and the same could prove to be true for CATs.

Commodity Exchange Token (CET)

One could create a "commodity exchange token" (CET) by purchasing a "basket of commodity contracts" and anchoring those contracts on a ledger. The contracts can include any combination of commodity options, futures or spot price contracts designed to create a representation of the ownership rights of a basket of commodities, that can be represented purely as an electronically mediated contract at any moment in time.

Contracts for a defined "basket of commodities" that are traded on publicly listed exchanges are purchased for a defined period. The contracts may bracket a spectrum of possible future prices that are designed to hedge against each other in such a manner that the combined outcome of holding the entire set of contracts has a net effect that is equivalent to owning the actual commodities at the present time, or as close to that goal as practical.

The CET is recorded as a token on a ledger. The CET can include a fee paid at the time of purchase or sale, or both, or paid at regular intervals. The CET can be recorded as a smart contract on a ledger such as for example, the ETHEREUM blockchain, or on any other ledger. The CET can create a token on a smart contract ledger that does not use a proof of work algorithm so that the CET does not result in a collateral carbon emissions impact.

The initial basket might represent a defined set of common commodities traded on established exchanges of, by non-limiting example: agricultural, energy and metals commodities.

A CET could be held by a DAO or IABO. The actual contracts could be executed by a smart contract on a ledger, or by JLINX contracts held by an IABO.

The contracts could be purchased to bracket a future period similar to a bond strip, and the proceeds from the maturity of contracts would be reinvested in the purchase of new contracts in a rolling vehicle that always owns a forward looking set of contracts for a defined basket of commodities.

The CET would be a token that can be purchased, redeemed, resold or renewed. The promise to the token holder would be to return value equal to the purchase price as measured in the combined commodity index price benchmark, less a fee.

Thus, in one possible scenario, if for example the U.S. dollar fell by 10% relative to the price of the combined basket of commodities futures, and the fee was 1%, the token purchaser could sell the token for 109% of the purchase price measured in U.S. dollars. If the value of the commodities fell by 10% relative to the U.S. dollar, the token would sell for 89% of the purchase price measured in U.S. dollars.

In another scenario, token purchase revenue would simply be applied to the purchase of a defined basket of commodities futures at a defined ratio. The token represents that basket of futures. As futures are purchased and redeemed over time the value of the token reflects that value less a fee.

The token is held on a ledger that supports smart contract logic that supports the business logic necessary to execute any combination of commodity options, futures or spot trades and to calculate the value of the token. The token value can be reported in the commodities market basket unit defined by the CET, or in U.S. dollars, or in any other unit relative to the basket of commodities at the present or future date.

The JLINX Token

One agent-based cryptographically signed contract technology infrastructure that can be used to create the CAT, and which can also be used to create any other IABO, is called "JLINC," a working technology elaborated in further detail below.

One interoperable technology that can be used to sign, exchange and hold decentralized JLINC contracts for IABOs may be provided and maintained by an IABO, or other entity, herein called "JLINX," that is built on JLINC and which provides JLINC technology as a service. JLINX tokens can be priced in pure TTs or CATs, or in any other token or fiat currency.

In this example, JLINX issues tokens that can be purchased at the current bid price by entering into a JLINC contract with the "JLINX IABO," or any other party that holds a JLINX token, using the purchaser's JLINC agent and the seller's agent. JLINX maintains a public auction price reporting system where JLINX-based IABOs, including JLINX itself, can list tokens for auction. The latest price recorded for each completed token sale transaction is published to a public ledger and a hash of that entry is recorded on the JLINX HYPERCORE.

In this example JLINX operates using cryptographic keys, represented as "JLINC DIDs," which comply with the Decentralized ID (DID) WORLD WIDE WEB CONSORTIUM (WC3) standard for key-based digital identity. Each JLINX token purchaser is represented by a decentralized identifier (DID). The purchaser's JLINC agent holds its own copy of the JLINC contract, signed by the JLINX IABO's agent. Both agents also send a signed hash of each token sale event to the JLINX HYPERCORE, as well as to any additional audit ledgers specified by any of the JLINX IABO token owners.

The JLINX HYPERCORE can be thought of as a "tokenless" ledger that can be used where only an immutable audit record is required to verify the cryptographically signed and counter-signed contractual exchange held by each of the parties' agents.

The JLINC DID can also contain and interoperate with keys created for a wallet on the ETHEREUM blockchain, or on any other ledger or blockchain, which could also be used off chain to sign contracts, then the hash of the contract used for audit could also be written to any ledger or chain. The keys belong to a DID and can be used to interact with both JLINC or a blockchain.

If an IABO owner elects to hold its own audit records on a blockchain that requires tokens or other payment to record transactions, then that IABO owner is responsible for paying all costs associated with writing to that blockchain.

The use of a proof-of-work ledger to record transactions could also be contractually defined as a violation of a climate protection covenant written into an IABO's founding contract, and IABO token purchase contracts could include a "carbon tax" for the additional energy consumed and thereby wasted by proof-of-work transactions.

One of the key innovations in the JLINX example is the "micro ledger." Each party's JLINC agent holds its own micro-ledger in a truly decentralized system that does not require any central distributed ledger or monetized tokens to function. Each party simply sends signed hashes to audit repositories to create immutable records of non-repudiable transactions recorded on the distributed network of all relevant micro-ledgers. Those audit repositories can be held on any MERKLE-TREE type implementation, such as HYPERCORE, IPFS, HOLOCHAIN, or any other similar ledger designated by any IABO.

JLINC agent software can also include application software logic that can operate on contracts and content that it receives and transmit information to other agents that can also operate on that information so as to achieve an overall network of distributed agents that achieve some of the capability of smart contract applications that would otherwise be able to be executed only on a token based ledger.

In implementations JLINX provides JLINC JSON-LD automated "API contract" technology to enterprises that wish to implement human-readable, legally binding, automated contracts for business purposes. JLINX provides IABO infrastructure to build truly decentralized organizations, with or without any single central distributed ledger.

JLINX tokens can represent compensation for business activity in an IABO, and can also represent contractual ownership of the JLINX IABO and may appreciate in value based on the expectation of increased use of JLINC technology and services for enterprise, fintech and IABO applications. JLINX tokens may also be able to be sold and traded on a JLINC-enabled digital exchange by any party with access to such infrastructure. They may be subject to the rules and tax requirements imposed by the IRS and other relevant tax authorities in other jurisdictions. In implementations purchasers of JLINX tokens need a JLINC-enabled wallet, which also provides the client-side JLINC agent, as well as a micro-ledger connected to the JLINX HYPERCORE on the Internet.

In implementations IABOs established on JLINX each reference a "secure contract" written in JAVASCRIPT programming language and expressed in JSON-LD format where each contract is hosted at a Uniform Resource Locator (URL) which contains a hash of the contract in the URL. Contracts can be forked from previous similar contracts on a GITHUB repository, or a similar repository, with any necessary or desired additions or amendments included in the new version of the contract. This allows new IABO organizational structures to evolve from previous similar IABOs where the new variation also becomes available as a starting point for the next generation IABO contract.

New types of organizational structures, including cooperatives and collective democratic organizations, or any other contractually governed LLC or other business structure with multiple classes of stakeholders and delegated voting and decision making also become available as templates for contractual equity governance organizing structures.

In implementations each automated JLINC agent can also run artificial intelligence (AI) machine learning algorithms on behalf of the party that owns that JLINC agent whereby the AI agent learns to act on behalf of that party based on the party's previous choices, decisions and preferences.

An entire IABO can employ AI machine learning algorithms to act on behalf of the organization under the contractual control of each member or under the aggregate control and agreement of the entire membership or a portion of the membership, where each party also has an autonomous capacity to enter into and sign such an agreement as a separate contract from the primary contract that created the IABO.

Mutual Credit on Personal Agent Ledgers

In implementations, the same decentralized JLINC agent and ledger technology developed to create JLINC based secure-contracts and JLINX IABOs can also be applied to providing a truly decentralized mutual credit infrastructure for people. The system can work for any population that has access to the Internet and individual smart phones, or possibly less advanced phones (or other computing devices) that can simply communicate with a JLINX HYPERCORE network on the Internet.

One of the biggest problems with money is that most of the liquidity is being hoarded by parties with the most wealth. That is accelerating and for the most part cryptocurrency is only contributing to that instead of doing anything to counteract it.

The economist Bernard Lietaer spent most of his life studying and advocating "mutual-credit" currencies. The idea behind mutual credit is that if one party can write another an IOU, and a third party will accept that, money has been created.

Another way to look at it is that each party can go a little bit in debt to the others. Instead of the central bank having the authority to allow borrowing, each party has that authority up to a small limit. In essence, each party has a personal ledger. The system is radically distributed if instead of there being any one single ledger, distributed or not, each party has exactly one immutable and publicly transparent personal ledger.

Then if each party also has a personal credit limit, and every party is allowed some basic amount of credit, when party A goes into debt to party B, party A shows a credit, but party B shows a debit on its ledger because it issued party A credit by taking a debit. If each party has an agent, and the network that each party exchanges with is limited to a small network of parties that actually know each other, and each party has a personal credit ledger visible to those it exchanges with, and each party clears its transaction with the opposite party at the time of the event, and a hash of each transaction is simply written to multiple immutable distributed public MERKLE-TREE type content addressable implementations such as HYPERCORE or IPFS, then the systems, apparatuses and methods disclosed herein may be able to provide universal liquidity to the population from the bottom up.

Reputational validity (i.e. credit rating) in such a system might be maintained using Friend-of-a-Friend or similar established trust network mechanisms to provide socially validated identity and thereby a socially triangulated and validated credit rating.

A feature that worked well for societies that did something similar with clay tablets or paper vouchers was to introduce a demurrage, essentially a negative interest rate that made the resulting tokens behave like a hot potato. They were an excellent means of exchange but a poor store of value. So, if I had one, I had a strong incentive to spend it. This kept a lot of liquidity in circulation. But those societies built long-term stores of value in stone pyramids and cathedrals. A modern-day analog might be solar panels and heat pumps as liquidity is provided for all people to live in a thriving real economy, while building out increasingly sustainable and durable infrastructure.

Green NFTS

One example of a difference between a token offered by a JLINX IABO and current smart contract tokens on the ETHEREUM blockchain (with huge carbon emissions due to the use of the ETHEREUM proof-of-work ledger) could be a JLINX NFT that is basically a contract between an artist and an art collector whereby the collector possesses irrefutably signed and universally verifiable and transferable bragging rights to "own" the digital equivalent of the artist's signed original work.

The same function that an NFT currently provides could be provided by a JLINX contract offered by one or more IABOs that perform this function for artists and collectors. The terms of the NFT contract could be hosted on a GITHUB server/repository (or using a similar service), and an instance of the particular contract that an artist wishes to use could be hashed. The artist posts the work and the link to the contract on a service where collectors can browse art, or on their own site, or both.

The collector who purchases the NFT for a particular work signs a hash of the contract with the artist's JLINX agent, and the artist's JLINX agent returns the signed contract to the collector's JLINX agent, and both JLINX agents send a signed hash of the transaction to each other's audit repository and the ledger specified by the IABO that facilitated the NFT listing. The transaction can also be publicly recorded on a listing held by the IABO or held only as a hash on a ledger for discrete private transactions between artists and collectors or networks of collectors, and a hash could also be written to any proof of stake ledger or blockchain.

Both the artist's JLINX agent and the collector's JLINX agent have a copy signed by the other party, and the contract can include a clause that if the collector resells the NFT, the artist will also receive a portion of that sale. The contract can be transitive, so the new collector that purchases the NFT from the first collector must complete the additional transaction with the artist to receive the signed NFT.

The actual payment transaction can be executed using the automated contract infrastructure, or any other out-of-band payment mechanism that is mutually agreed upon by the parties to the contract, and which is specified as valid under the terms of the contract. That can be in tokens or U.S. dollars or chickens, as the contract is independent of the payment mechanism and the value of the digital exchange is the utility of the contract, not the currency instrument used to transact the exchange of value.

Other System and Method Examples

Referring now to FIG. 1, example elements of a system 100 for implementing the above methods is shown. In implementations the system includes a plurality of computing devices. For example, computing device (device) 102 includes interface 104 and is an administrator device. This device may be used by an administrator (admin) to populate a data store (such as database 108, using database server (DB server) 106), make changes to the database elements, set up and configure user interfaces to interact with the system, and so forth. In implementations data stores other than databases may be used. As used herein, a database is considered a subset of a data store. In the implementation shown the admin device is coupled with the DB server directly, though also through a telecommunications network 110 which may be, by non-limiting example, the Internet, though it could also be a local area network (LAN) in a more localized deployment of the system. The admin device could also communicatively couple with the database/DB server through a web server 112, such as by accessing a website using credentials. End users could also interact with the system through one or more websites implemented using the web server. The admin device is shown as a desktop computer but could be a laptop, mobile phone, tablet, smart watch, smart speaker, smart glasses, and so forth.

In implementations the admin computer, DB server, database, web server, and the like could all be implemented on a single machine (such as using virtual servers on a single machine) but in large deployments there will more likely be a plurality of cloud-connected server racks used to implement these various elements as the number of users scales up. For example, AMAZON WEB SERVICES (AWS) server racks may be utilized to implement the database servers, the databases, the web servers, and so forth so that the number of users may be increased to very large numbers.

In implementations the system may interact with any number of third party server(s)/database(s) 114 to carry out the described methods. Users may connect with the system using a variety of user devices. System 100 shows a number of user devices simultaneously communicatively coupled with the system and database 108 via the telecommunications network, including a personal computer (computer) 116 having a display 118 and an associated microphone/speaker 120, a number of mobile phones 122-126 each having a display (128-132) and microphone/speaker elements (134-138), smart glasses 140 including a display 142 and microphone/speaker elements 144 (a representative example of this would be GOOGLE GLASS), a mobile tablet (tablet) 146 including display 148 and microphone/speaker elements 150, a smart watch 152 including a display 154 and microphone/speaker elements 156, a smart speaker 158 including microphone/speaker elements (representative examples would be GOOGLE HOME, AMAZON ECHO, APPLE HOMEPOD, and the like), and any other human interaction device (device) 162 which may include microphone/speaker and other input/output elements for user interaction (by non-limiting example, user interfaces integrated in automobiles, trucks, buses, airplanes, telephones, interactive advertising displays, street furniture, Internet of Things devices, wearable technology, virtual receptionist kiosks, robots, and any other human interaction device now known or hereafter discovered/invented).

The system at any given moment may have fewer or more user devices communicatively coupled with it, and each type of device may be scaled up to any number of users, so that FIG. 1 is a simplified diagram. In implementations, for example, there may be thousands of users or more simultaneously interacting with the system and the system may include any number of servers, databases, web servers, computing devices, and so forth to implement it. The system may interact with third party software/elements on the user devices (which may involve their own accessing of remote servers and databases and the like). The system may also have other elements for implementing the method(s) that are not shown in the drawings, such as one or more application servers communicatively coupled with one or more other elements of the system. Although not shown in the drawings, all of the computing elements/devices and servers may include one or more processors configured to perform the methods or portions thereof.

Example elements of a system for implementing the disclosed methods have been described at a high level by way of example only, and not limitation. Thus, the breadth and scope of a preferred embodiment of a system for implementing the methods should not be limited by any of the herein-described exemplary embodiments.

Figure 2:
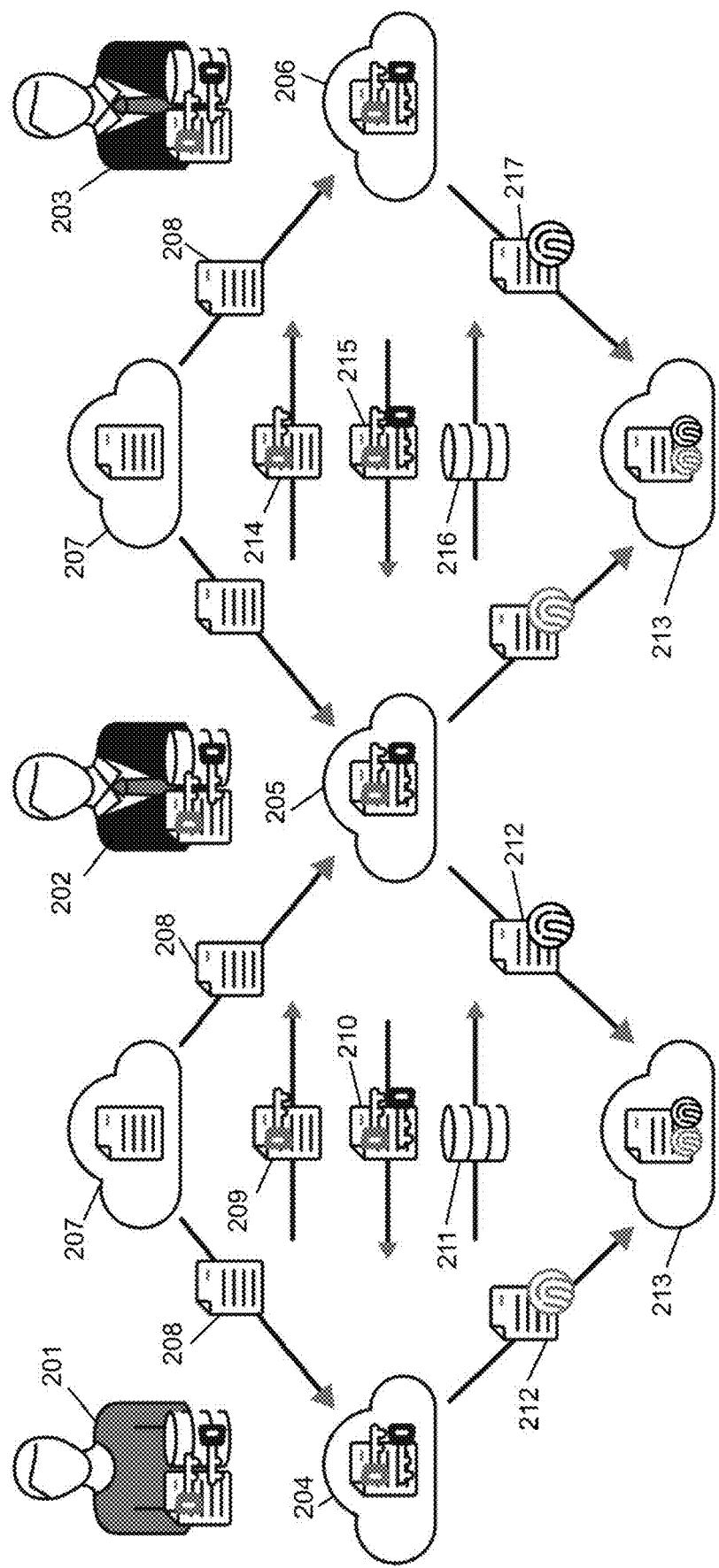
FIG. 2 is a diagram view representatively illustrating elements of the system of FIG. 1 and related methods.
Figure 4:
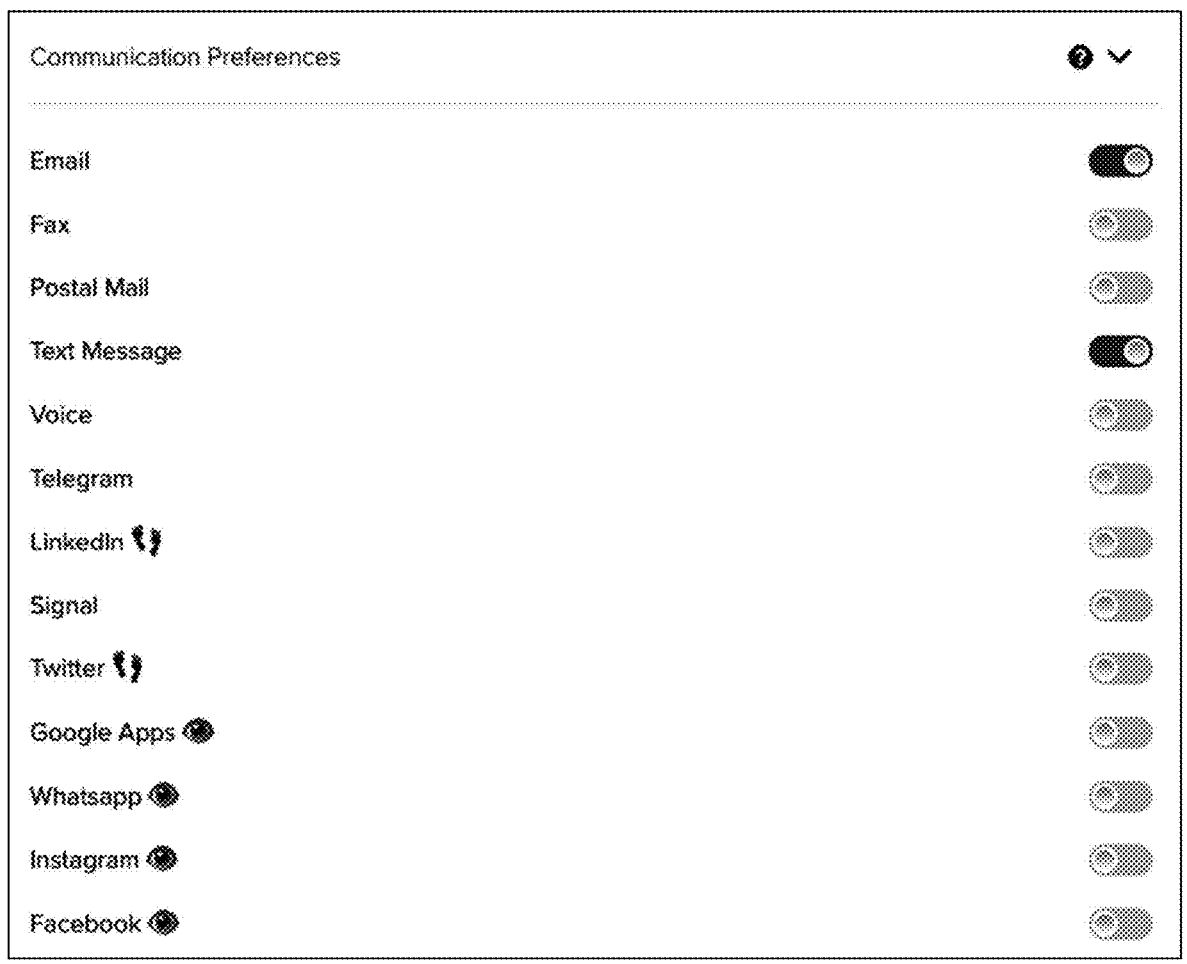
FIG. 4 is an example user interface implemented using the system of FIG. 1.
Figure 6:
FIG. 6 is an example user interface implemented using the system of FIG. 1.
Figure 7:
FIG. 7 is an example user interface implemented using the system of FIG. 1.

FIG. 2 is a diagram representing additional system and method elements that may facilitate the methods discussed above. In FIG. 2 there are three users: user A 201, user B 202, and user C 203. While these users could be individuals (and indeed in many instances user A will be an individual) they could also be non-individual entities in some implementations—such as a business organization. Element 204 represents user A's software agent, element 205 represents user B's software agent, and element 206 represents user C's software agent. Such software agents may operate and/or exist on any user devices, such as any of the computing/user devices shown in FIG. 1. Elements 207 represent contract servers or, in other words, computer servers that at least partially facilitate the methods (this could for example be or include any of the servers described with respect to FIG. 1).

Elements 208 represent contracts (standard, human-readable contracts). Element 209 is a contract signed by user A. Element 210 is a contract countersigned by user B. Element 211 represents data encrypted by user A with user B's public key. A hash of the contract is generated, and element 212 represents cryptographic signatures to the hash from user A and user B thereby establishing a cryptographically signed hash which validates a finalized contract, the cryptographically signed hash comprising the hash and the cryptographic signatures. The leftmost element 213 represents one or more audit records of the cryptographically signed hash recorded on any combination of immutable logs, ledgers or blockchains.

Element 214 represents another contract (including the same terms as contract 208) signed by user A or by user B on behalf of user A. Element 215 represents the contract countersigned by user C. Element 216 represents data encrypted by user A (or encrypted by user B on behalf of user A) with user C's public key. A hash of the contract is generated, and element 217 represents a cryptographic signature to the hash from user C thereby establishing a cryptographically signed hash which validates a finalized contract, the cryptographically signed hash comprising the hash and cryptographic signatures from user C and either user A or user B on behalf of user A. The rightmost element 213 represents one or more audit records of the cryptographically signed hash recorded on any combination of immutable logs, ledgers or blockchains.

It is pointed out that FIG. 2 generally represents a scenario where user C 203 is signing with user B 202 under a provision of the SISA where user B 202 is permitted to re-share with user C 203 on behalf of user A 201 under the terms of the SISA. Under this scenario the contract between the rightmost contract server 207 and user B software agent 205, and the cryptographic signature between the user B software agent 205 and the rightmost audit record 213, are basically mirror elements of the leftmost contract 208 and cryptographic signature 212, but are now communicated to/from and associated with user B software agent 205 instead of user A software agent 204. In implementations in which user A directly contracts with user C, these mirror elements could be removed from the drawing (or the user C elements could simply replace the user B elements, since user A in that case is directly contracting with user C instead of indirectly through user B). Other configurations are possible, and these are only examples. In implementations the cryptographic signatures over the hash are provided in sequence, for example user A 201 providing a cryptographic signature over the hash of the contract (leftmost element 212) and then user B 202 providing a cryptographic signature over the hash of the contract (rightmost element 212) or vice versa. In implementations user A provides a cryptographic signature over the hash (or in other words user A's cryptographic signature is added to the hash to create a modified hash, or in implementations the original hash and user A's cryptographic signature are hashed to form the modified hash) and then the modified hash is sent to user B and user B then provides a cryptographic signature over the modified hash (or in other words user A's cryptographic signature is added to the modified hash to create a finalized hash, or in implementations the modified hash and user B's signature are hashed to form the finalized hash). This may also be done in reverse so that user B first provides a cryptographic signature to create the modified hash and user A then provides a cryptographic signature to create the finalized hash. In some implementations the users A and B may provide their cryptographic signatures simultaneously or otherwise without the hash being modified and the two signatures may be appended to the hash by the system to create the finalized hash and finalized contract.

Continuing with the above FIG. 2 example, FIGS. 3-13 show representative examples of user interfaces that user A may encounter during the methods. In these figures the contract itself uses the example of what will be referred to herein as a Standard Information Sharing Agreement (SISA) which governs the use of user A's data by user B and any other users down the chain. That being said, the practitioner of ordinary skill in the art will understand how similar user interfaces and underlying system elements may be used to accomplish other methods disclosed herein such as the formation and facilitation of decentralized autonomous organizations (DAOs), cryptographic tokens, mutual credit on personal agent ledgers, green NFTs, commodity index tokens, commodity asset tokens, and so forth.

Returning to FIG. 3, the example user interface includes a number of selectors which allow the following functionalities: an import selector allowing the user to import a set of data and settings that could then be applied to the SISA with the currently selected organization; entering of user identification including names, email addresses, salutations, physical address, birth date, gender, phone numbers, fax numbers, social media accounts/handles and website URLs, and so forth. The example user interface of FIG. 4 allows user A to set communication preferences from among a variety of options such as email, fax, postal mail, text messages, a number of social media messaging services/platforms, and so forth. The example user interface of FIG. 5 allows user A to set standard permissions for marketing and communication preferences related to data sharing and use, including content permissions, data sharing permissions, data purpose permissions, and data management permissions as required under for example the General Data Protection Regulation (GDPR) in the European Union (EU). In the example user interface of FIG. 6 the user is back at the interface of FIG. 3 and has selected the import selector to import fields and/or SISA terms from one or more preexisting SISAs (shown in a dropdown menu) to apply to the current SISA. User A could, for example, select a preexisting SISA with Acme Inc. or any of the other listed parties to import SISA terms for a new SISA with another party. In the example user interface of FIG. 7 user A has selected the "Apply to All" selector to apply the current SISA settings/selections to all other SISAs, and a popup window is asking for confirmation. In the example user interface of FIG. 8 user A may view a list of all existing SISAs and may navigate to any of them. Each listed item also shows a date of execution of the SISA. A Data Defaults selector may be selected to view user A's default data settings or data usage/sharing terms for all future entered SISAs.

Figure 8:
FIG. 8 is an example user interface implemented using the system of FIG. 1.
Figure 9:
FIG. 9 is an example user interface implemented using the system of FIG. 1.

The example user interface of FIG. 9 may be viewed by user A selecting the "view SISA" selector for Energy Partners LLC from FIG. 8. The detailed view of FIG. 9 has an "All SISAs" selector which navigates back to the FIG. 8 interface. The detailed interface of FIG. 9 includes various details of the SISA with Energy Partners LLC and has a number of selectors to view event details, edit shared data, and so forth. Entries on the detailed interface also show changes to the SISA or to account information such as contact information. In the example user interface of FIG. 10 the user has clicked on or selected the underlined "Standard Information Sharing Agreement" text of FIG. 9 and a popup window is displayed discussing details of the SISA. In the example user interface of FIG. 11 the user has clicked on or selected the underlined "show more" text of FIG. 9 and additional information is displayed, including user A's (Rights Holder) decentralized ID (DID) and a link to the full text of the SISA. FIGS. 12A and 12B show portions, respectively, of the full text of the SISA that user A can view upon clicking on or selecting the link to view the full text. FIG. 12A shows a top portion of the full text and shows that it is located at a URL accessible by user A. FIG. 12B shows a lower portion of the full text that the user may scroll down to. FIGS. 12A and 12B do not show the full text entirely, but only the first two screens of text are included, for brevity. FIGS. 12A and 12B show, however, that the SISA is a human readable, legally enforceable contract.

The FIG. 9 and other interfaces may include a link to information about the other party to the SISA. For example, in FIG. 9 the text may say "You signed a Standard Information Sharing Agreement with Energy Partners LLC on Oct. 13, 2021" and the "Energy Partners LLC" text could be a link such that if user A selects or clicks on it the user navigates to another user interface or page about Energy Partners LLC (which in this example is user B). In the example user interface of FIG. 13 user A has again selected the "Standard Information Sharing Agreement" link to display the SISA general information—FIG. 13 also shows additional information at the top of the user interface such as a search bar and links to a feed, hubs, messages, notifications, settings, and so forth.

Figure 10:
FIG. 10 is an example user interface implemented using the system of FIG. 1.
Figure 11:
FIG. 11 is an example user interface implemented using the system of FIG. 1.
Figure 13:
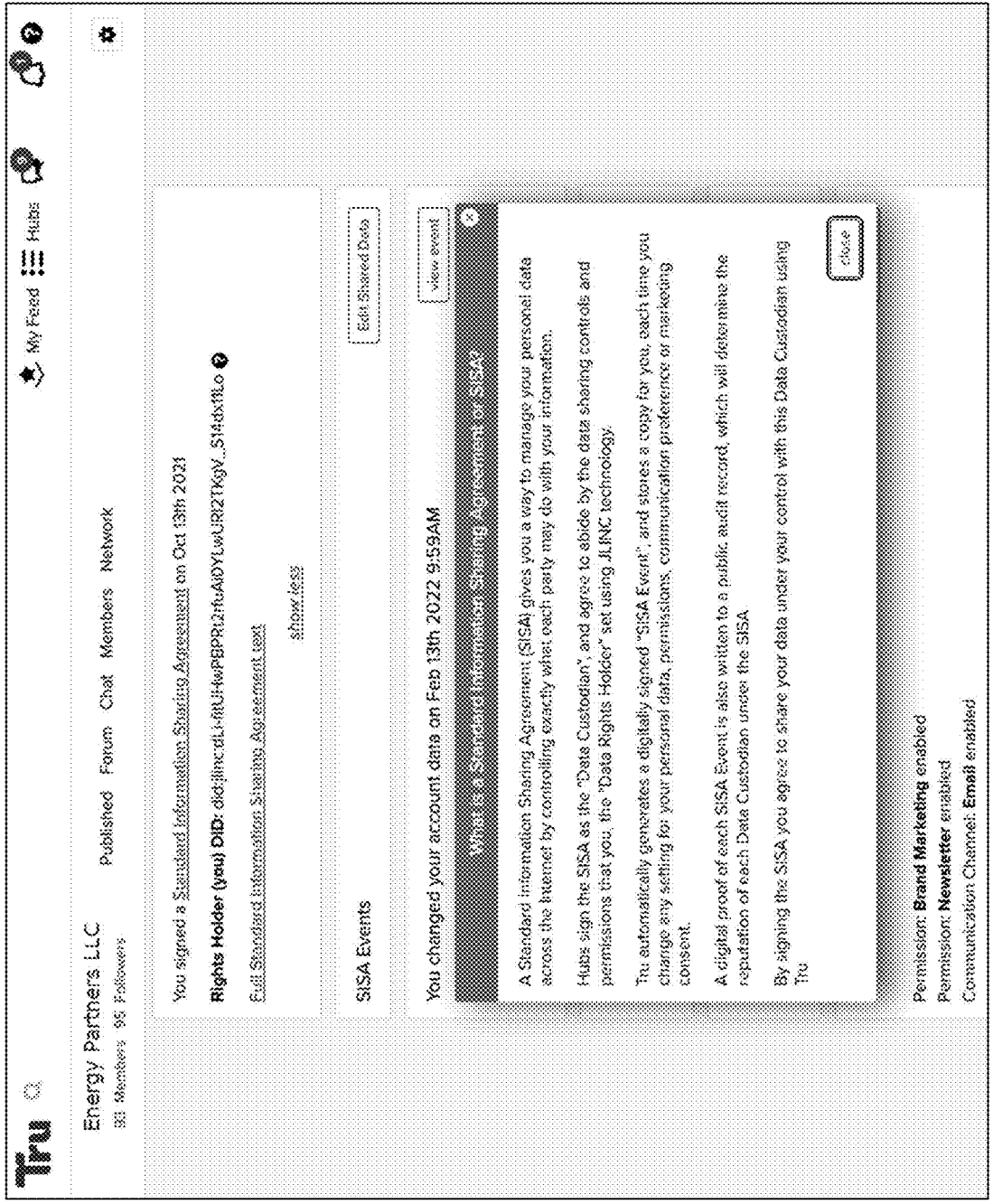
FIG. 13 is an example user interface implemented using the system of FIG. 1.

In the terminology of FIGS. 3-13 user B is called a "Hub." FIG. 10 shows that hubs sign SISAs with individual data rights holders (such as user A) to act as data custodians and agree to abide by data sharing controls and permissions that the data rights holders set using SISAs. FIGS. 3-13 show example user interfaces that the data rights holder (such as user A of FIG. 2) sees and interacts with. FIGS. 14, 16, 17, 19, 21, 23 and 24 show some example user interfaces that the data custodian (such as user B of FIG. 2) sees and interacts with.

Figure 14:
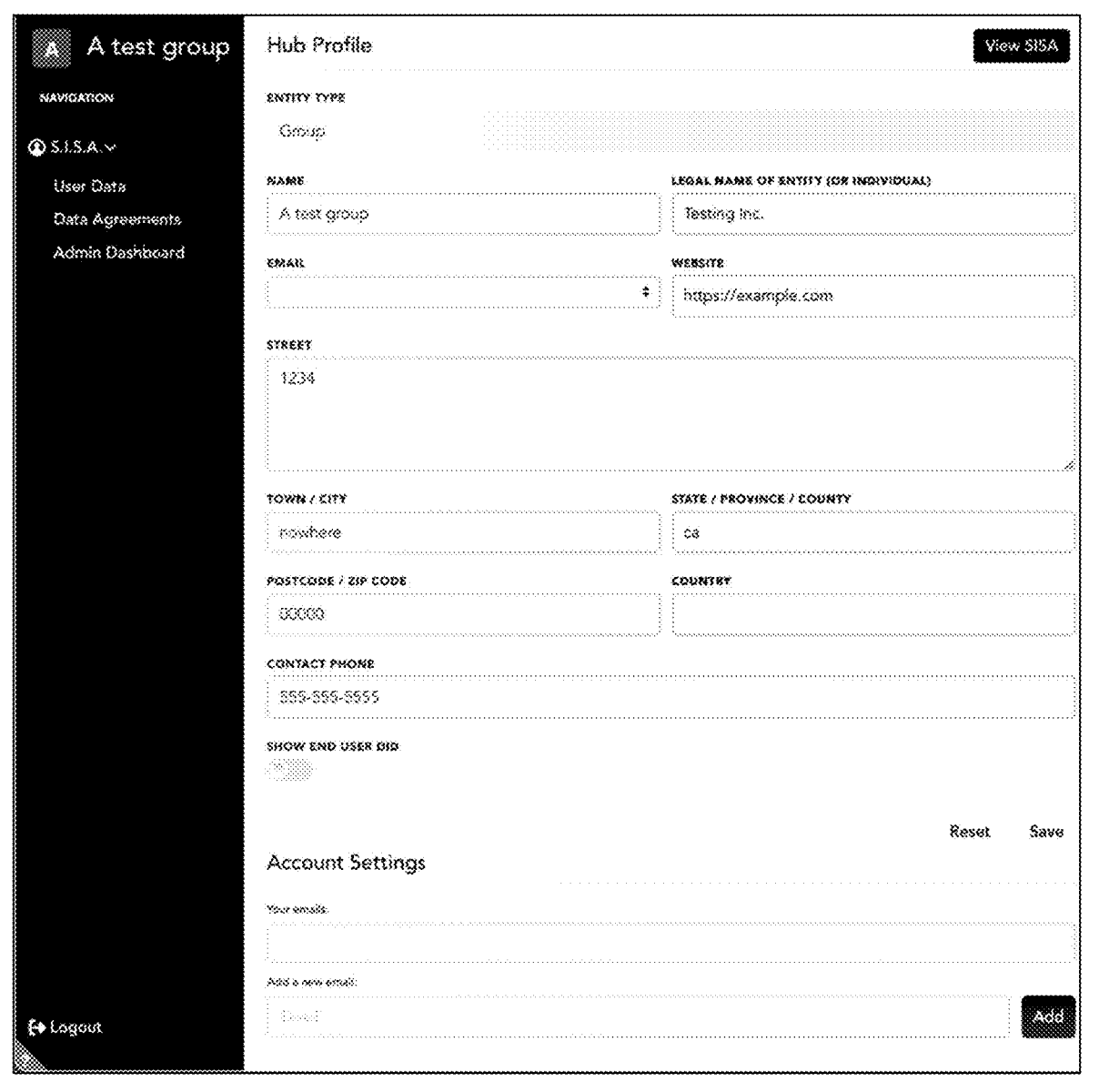

In the example user interface of FIG. 14 user B can set up or edit profile and contact information, including a URL. A toggle is included to show end user DID(s). A left menu shows navigation selectors to see User Data, Data Agreements and an Admin Dashboard. A logout selector is included, as is a View SISA selector.

A "hub," as that term is used herein, represent two user management models. In some implementations a hub is built on top of SISAs where users can share personally identifiable information (PII) with an organization under a SISA—the hub itself entering into SISAs with the individual members and the group/hub additionally entering into SISAs with other parties (user C in FIG. 2) with respect to what those parties do with the data of each individual in the group. The SISAs between the hub and other parties (user C) may mirror the terms of the SISAs between users A and B). Alternatively, user B may simply facilitate each user A entering into additional agreements down the chain with users C such that those agreements are technically between users A and users C without user B acting as an intermediary in any way. In other implementations a hub is effectively a group of individuals (each individual being a user A) used for publishing and subscription where people can become members of the hub without signing a SISA with the hub itself (though the hub may still enter into SISAs with other parties to govern what will happen with data from the members of the group).

Figure 15:
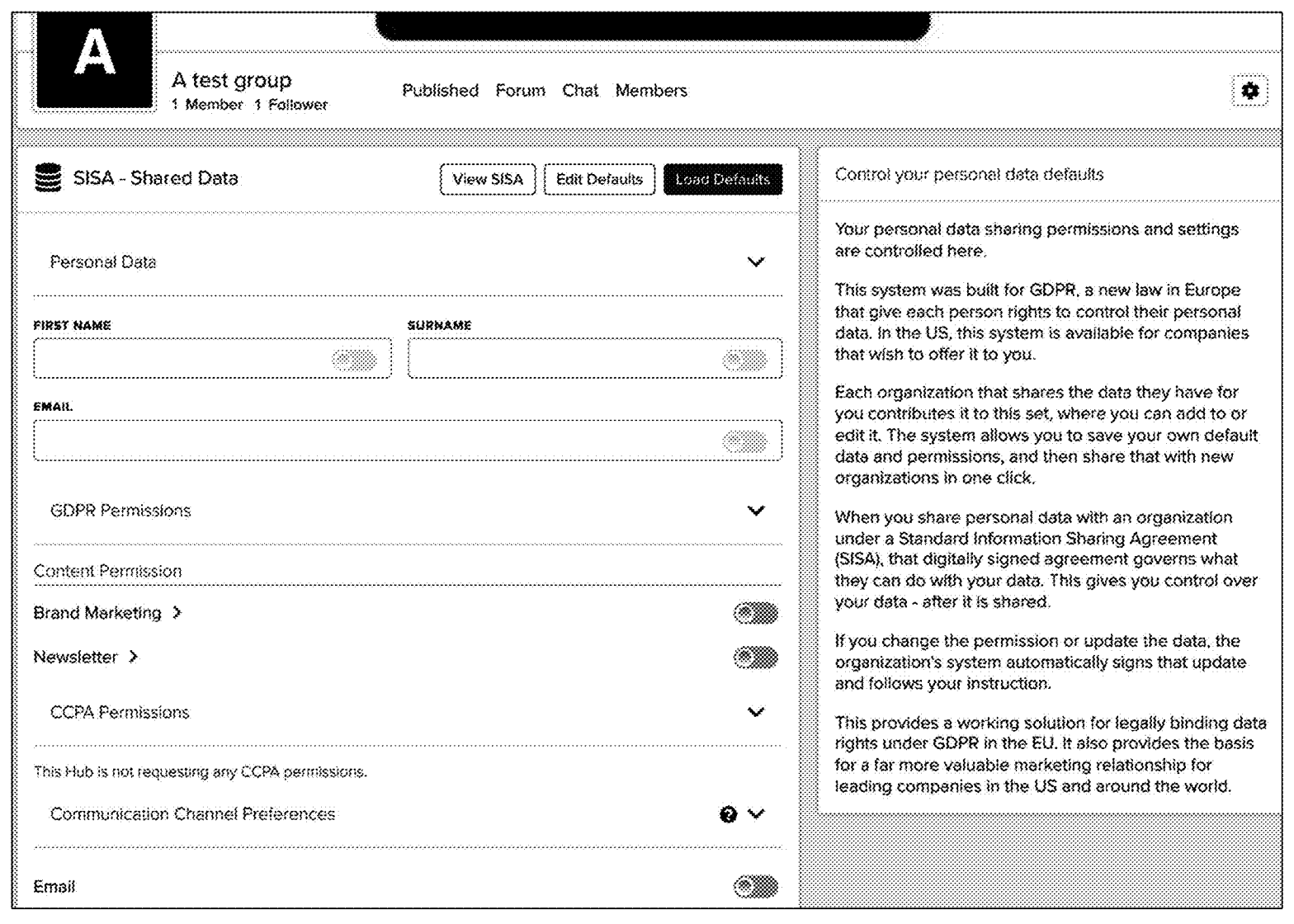

FIG. 15 is an example user interface allowing user A, a member of the group or hub, to select which items of information may be shared, and for what reasons, and so forth. Selectors are included to view the SISA that the member has with the hub/group, to edit default SISA terms, and/or to load default SISA terms.

Figure 16:
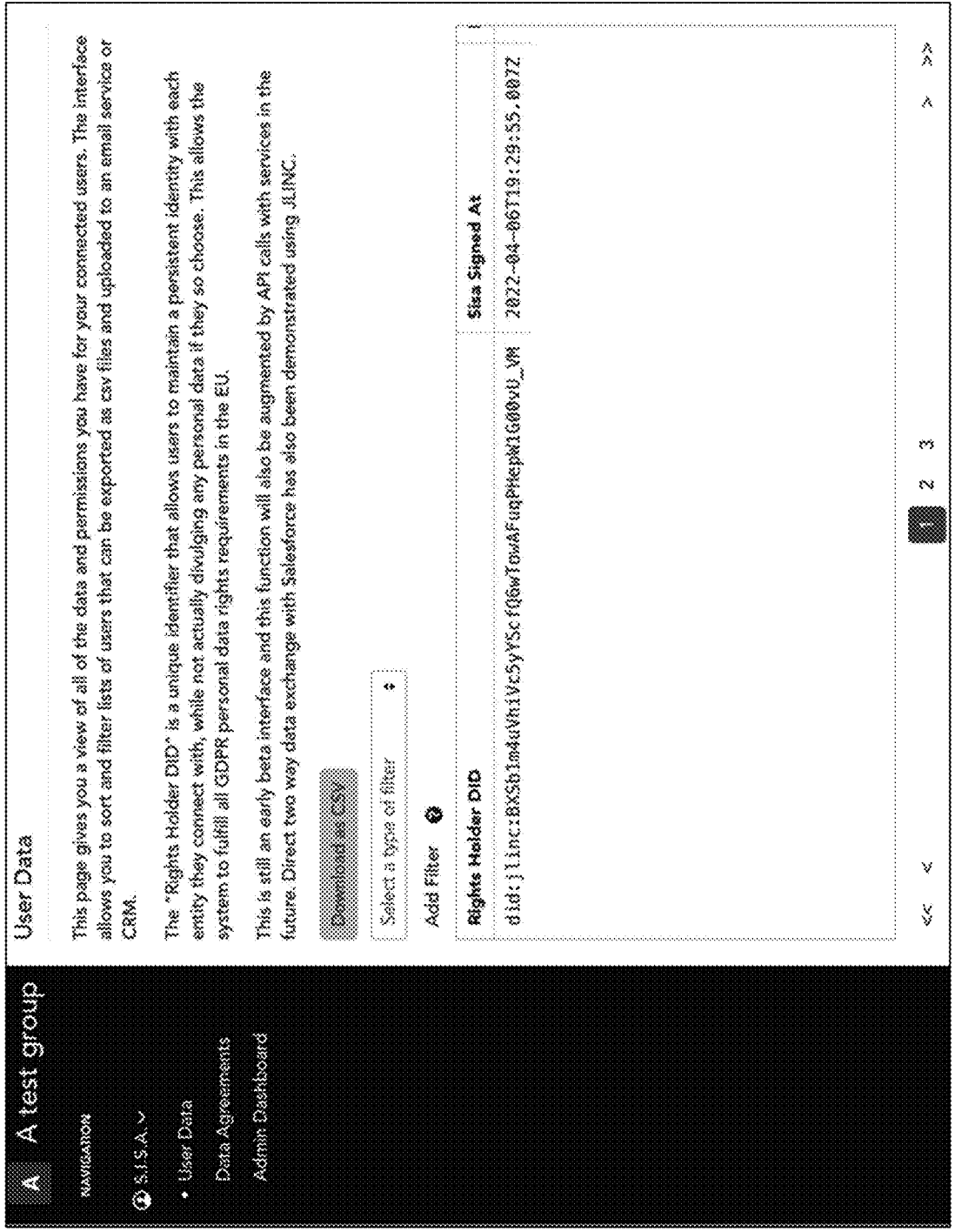
FIG. 16 is an example user interface implemented using the system of FIG. 1.

FIG. 16 shows an example of a user interface that may be displayed when user B selects the left menu item "User Data." Here user B can see, filter, and export information related to all of the data and permissions for users in the group. Each rights holder's DID is shown along with a date of signature of each SISA. In this example the group only has one member so only one DID is shown, but naturally each group/hub may have any number of members.

Figure 17:
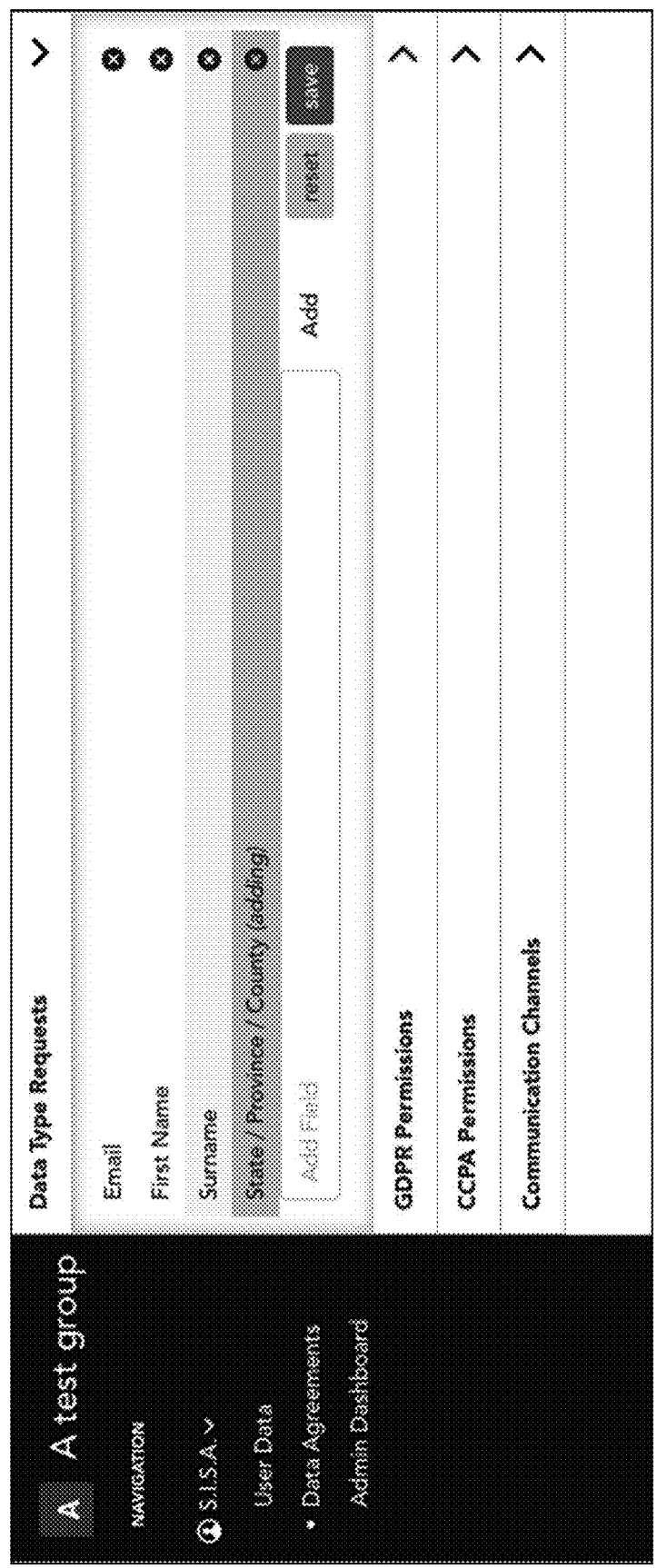
FIG. 17 is an example user interface implemented using the system of FIG. 1.

FIG. 17 shows an example of a user interface that may be displayed when user B selects the left menu item "Data Agreements." This is an interface that lets user B select which data types to include in requests from users A. One could think of the interface as having a long list of possible data types and permissions from which each user B can select a relevant subset that their organization actually requests from users A.

Figure 18:
FIG. 18 is an example user interface implemented using the system of FIG. 1.

FIG. 18 shows a close-up view of a portion of FIG. 15, described previously.

Figure 19:
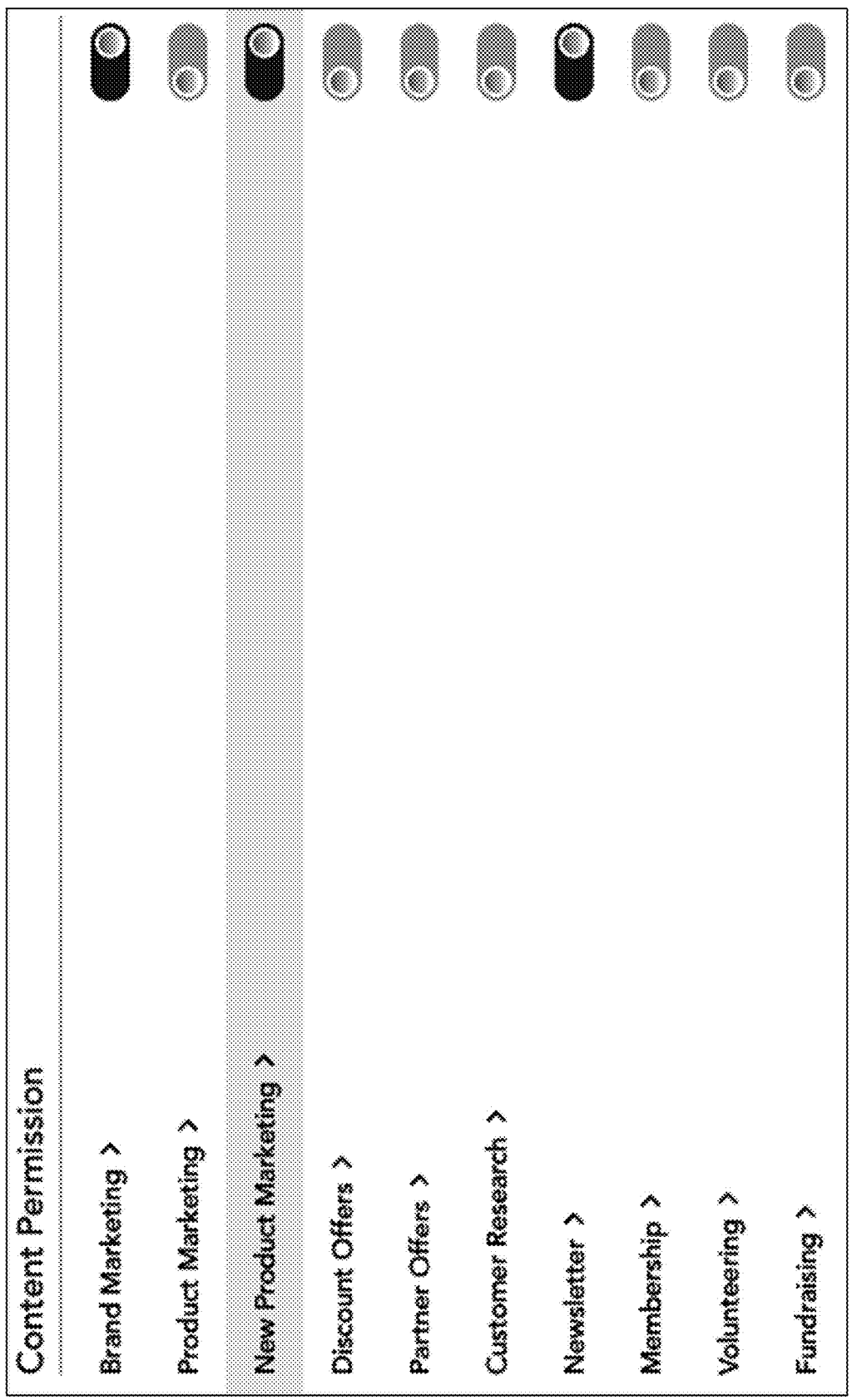
FIG. 19 is an example user interface implemented using the system of FIG. 1.

FIG. 19 is an example user interface where user B selects, from a list, what types of content permissions are requested from users A. Here for example user B has selected to request users A to share data for brand marketing, new product marketing, and newsletters, but not for other purposes.

Figure 20:
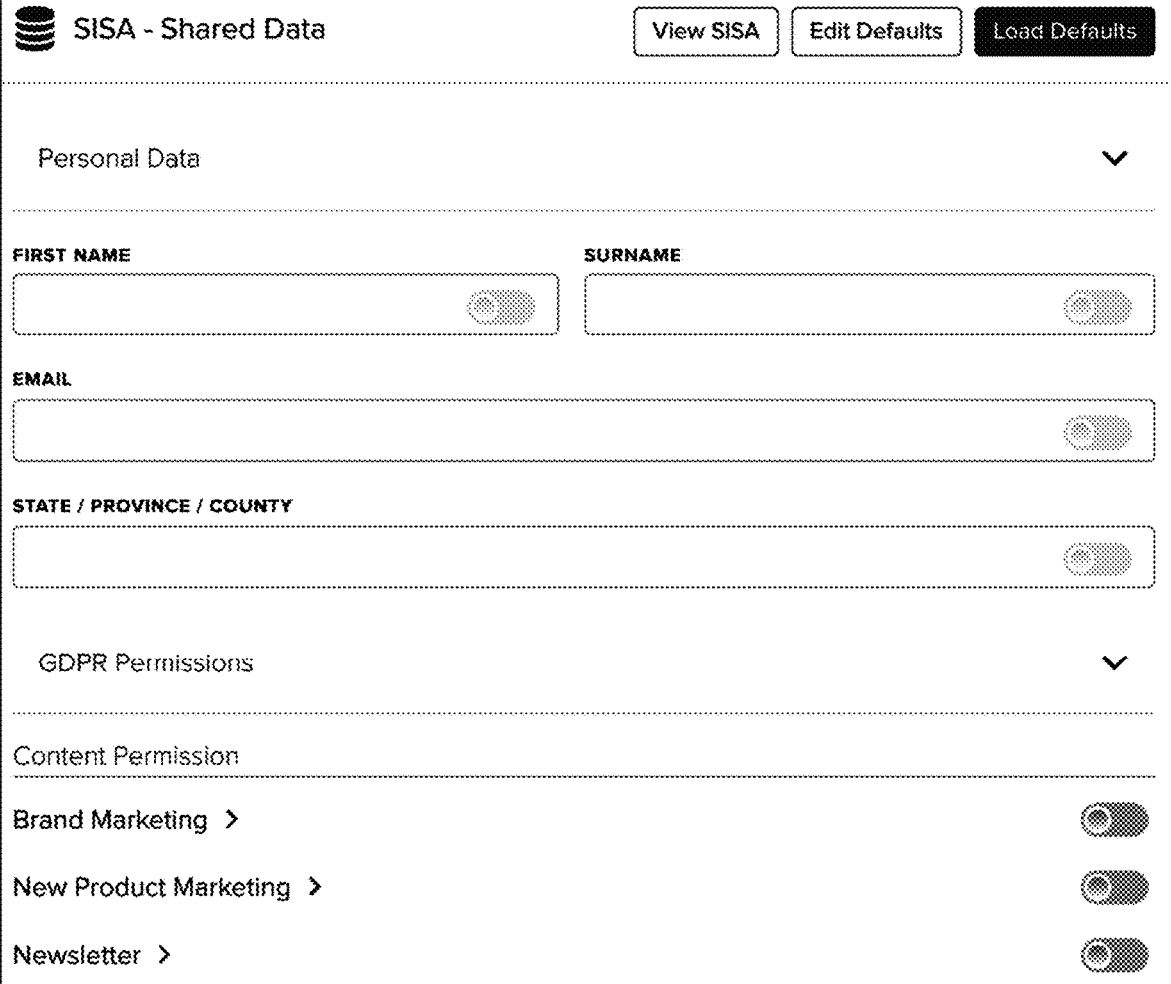
FIG. 20 is an example user interface implemented using the system of FIG. 1.

Once user B has updated the settings in FIG. 19, these settings are reflected in other user interfaces. For example, FIG. 20 is similar to FIG. 15 except that the content permissions are updated to reflect that user B is requesting to share user A's data for Brand Marketing, New Product Marketing and Newsletters. Since user B had only selected these options on the interface of FIG. 19, only those options show up on user A's FIG. 20 interface. Each organization or hub accordingly sets which items are requested from the group/hub members and then, on the interface for that organization or hub seen by the group members, the users A only see requests for the types of data that organization has selected to request. Additionally, however, each user A may have a home screen or other interface where the user may set default pre-set responses to any such data requests (and those preferences may automatically update the toggles on FIG. 20 for user A to the preselected preferences). Additionally, the user can manually, from FIG. 20, toggle any of the permissions to allow the data sharing/use (by toggling to the right) or may leave the toggles toggled to the left (off) to disallow such sharing/use. If user A has not previously provided a default preference with regards to the specific items requested by user B on FIG. 20, those items will default to the off position to disallow sharing/use until the user manually toggles them to allow such sharing/use of data. In implementations each user A may select default settings and then apply them to all hubs to automatically allow/disallow sharing and use of data according to the selected default settings. Each user B or hub/group will receive each user A's response to any data request (automatically answered either in the negative with no data being provided or in the positive with the data being provided).

Figure 21:
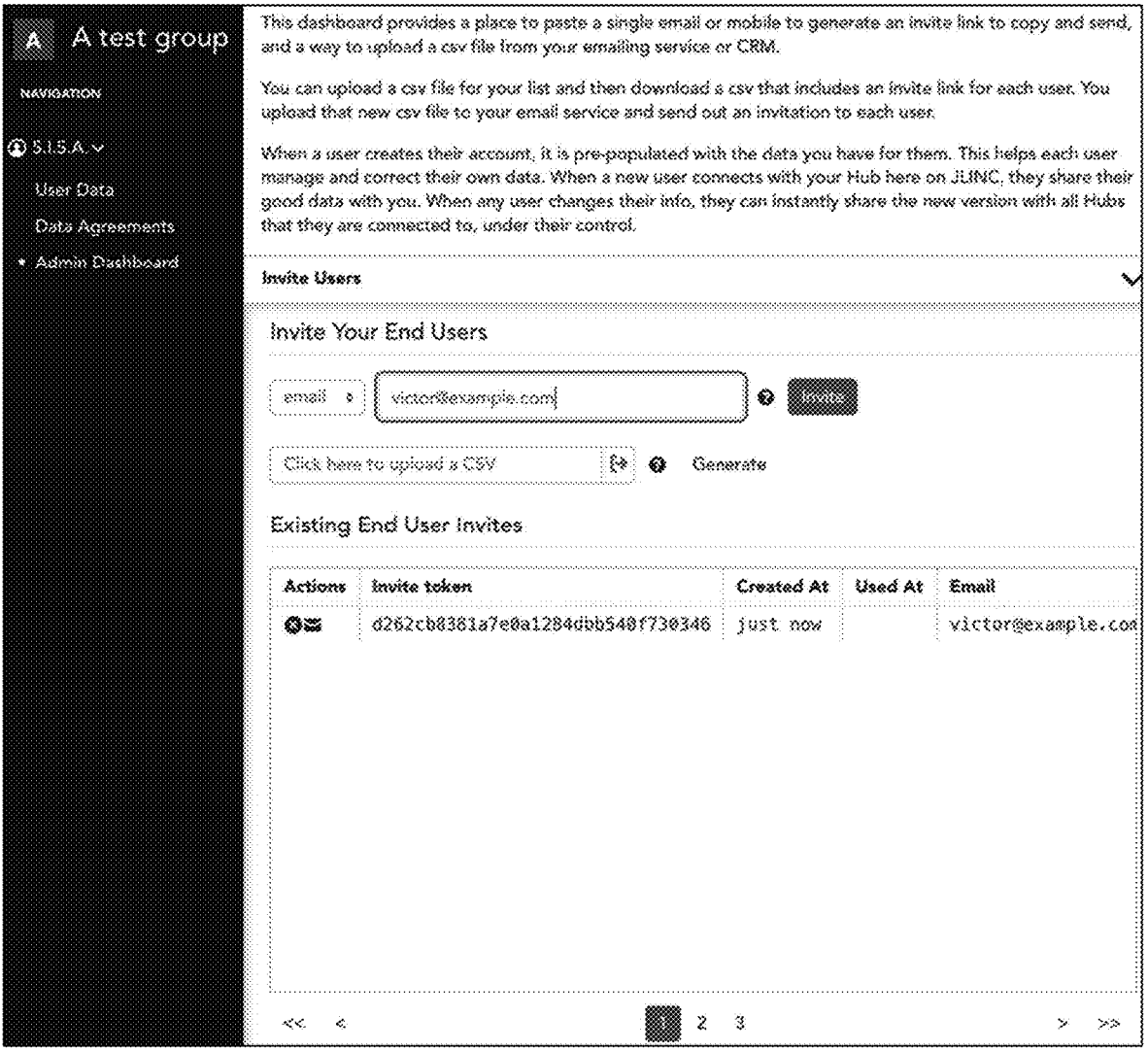
FIG. 21 is an example user interface implemented using the system of FIG. 1.

FIG. 21 is an example of a user interface that may be displayed when user B selects the leftmost Admin Dashboard menu item. Here the administrator of the group (in this case user B) may invite other end users (in this case users A) to join the group using their email or phone number, and may upload a comma-separated values (CSV) file which includes information of users already in the group, and may also view existing/pending end user invites.

Figure 22:
FIG. 22 is an example user interface implemented using the system of FIG. 1.

FIG. 22 shows an interface similar to FIG. 20. On this interface the user A has chosen to allow data sharing for new product marketing and newsletters, but not for brand marketing. This may reflect either the user's manual choices on the FIG. 22 interface for this specific organization/hub or these selections may have been automatically selected based on user A's prior default settings for all hubs.

Figure 23:
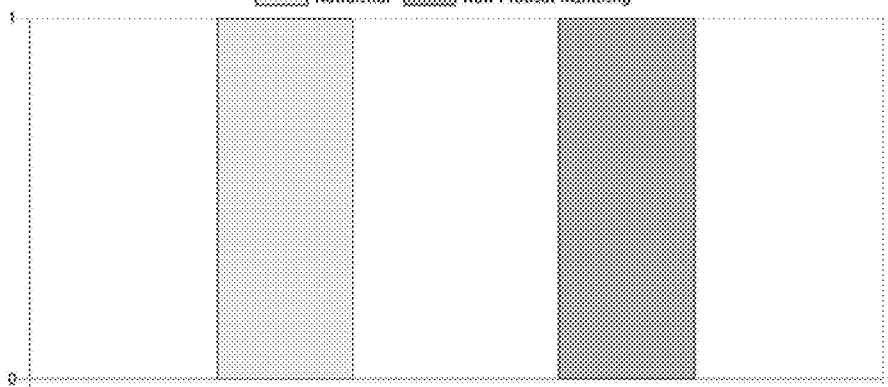
FIG. 23 is an example user interface implemented using the system of FIG. 1.

FIG. 23 shows that the Admin Dashboard may also include a permission report. In this example, there is only one user in the group and that user has allowed data sharing for the newsletter and new product marketing, but not for other reasons. In an example where there are many users in a group the permissions report would show the number of users who have allowed data sharing for different purposes. In this example the single user has not allowed data sharing for brand marketing, so that item is not included on the graph as zero users have thus allowed sharing for that purpose.

Figure 24:
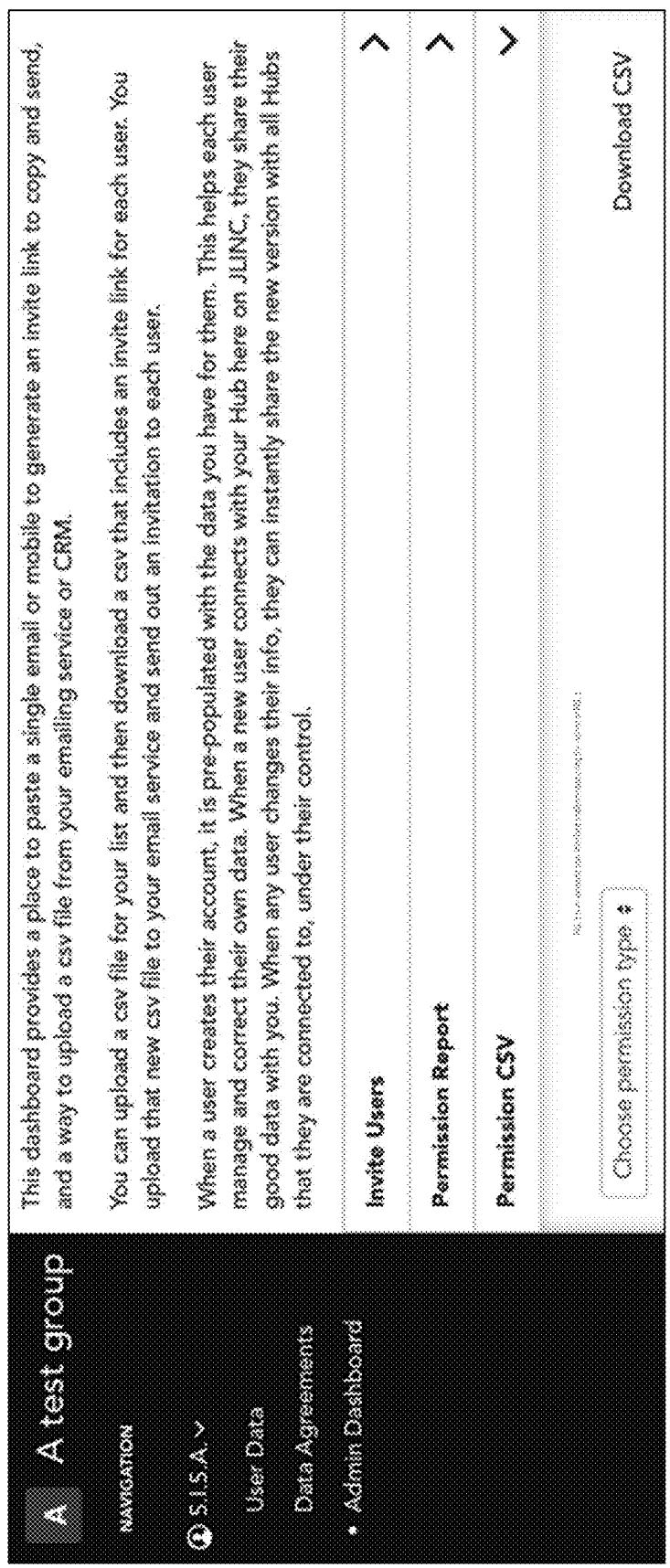
FIG. 24 is an example user interface implemented using the system of FIG. 1.

FIG. 24 shows that the Admin Dashboard also includes a Permission CSV that allows the admin to download a CSV file. The permission CSV is a representation of a table that could be in a database, where for each user represented as a row, there are columns for each data type and permission.

For those users that have responded to the type represented by each column there is a value.

The systems, apparatuses and methods disclosed herein allow for automated contracts beyond those which merely govern data exchange. The contracts herein may or may not govern data exchange and can include governance agreements for organizations that provide a functional mechanism for flexible ongoing participatory governance by stakeholders through software agents acting on their behalf. This allows for a modified type of DAO that is not merely self-executing code on a blockchain (and indeed may not be self-executing at all) but provides much more functionality.

The green NFTs discussed herein may in implementations represent a viable alternative to existing casino tokens. The NFTs discussed herein may be used to support artists better than existing NFTs.

The systems, apparatuses and methods disclosed and claimed herein represent improvements to the functioning of computers. Providing DAO functionality without a blockchain requiring a consensus algorithm dramatically reduces the computational requirements vastly improving the thermodynamic efficiency of the involved computing devices. Blockchains requiring a consensus algorithm introduce computational overhead and complexity, while those that require proof-of-work for consensus have an egregious carbon footprint. The novel DAOs, IABOs, NFTs and tokens and related elements and methods disclosed herein do not require a consensus algorithm. As a result, much of the computing resources of the computers and computing devices involved are freed up to perform other actions. This allows for much faster computing with less processing time and therefore resources required and at far greater thermodynamic efficiency.

The systems, apparatus and methods disclosed and claimed herein further represent improvements to the technical fields of DAOs, NFTs, and a variety of tokens, as discussed above. Specifically, human-readable automated agreements facilitate legally defined contracts in addition to, or in place of, self-executing computer code on a blockchain which has been erroneously described as a "smart contract." In addition, the automated agent-based contracts described herein can be programmed in JSON by any web developer without the specialized skills required to write code for smart contracts in the SOLIDITY language on ETHEREUM.

In places where the description above refers to specific implementations of apparatuses and methods for facilitating cryptographically mediated organizations and tokens and related interactions, one or more or many modifications may be made without departing from the spirit and scope thereof. Details of any specific implementation/embodiment described herein may, wherever possible, be applied to any other specific implementation/embodiment described herein. The appended claims are to encompass within their scope all such changes and modifications as are within the true spirit and scope of this disclosure.

In places where the phrase "one of A and B" is used herein, including in the claims, wherein A and B are elements, the phrase shall have the meaning "A and/or B." This shall be extrapolated to as many elements as are recited in this manner, for example the phrase "one of A, B, and C" shall mean "A, B, and/or C," and so forth. To further clarify, the phrase "one of A, B, and C" would include implementations having: A only; B only; C only; A and B but not C; A and C but not B; B and C but not A; and A and B and C.

Furthermore, in the claims, if a specific number of an element is intended, such will be explicitly recited, and in the absence of such explicit recitation no such limitation exists. For example, the claims may include phrases such as "at least one" and "one or more" to introduce claim elements. The use of such phrases should not be construed to imply that the introduction of any other claim element by the indefinite article "a" or "an" limits that claim to only one such element, and the same holds true for the use in the claims of definite articles.

Additionally, in places where a claim below uses the term "first" as applied to an element, this does not imply that the claim requires a second (or more) of that element—if the claim does not explicitly recite a "second" of that element, the claim does not require a "second" of that element. Furthermore, in some cases a claim may recite a "second" or "third" or "fourth" (or so on) of an element, and this does not necessarily imply that the claim requires a first (or so on) of that element—if the claim does not explicitly recite a "first" (or so on) of that element (or an element with the same name, such as "a widget" and "a second widget"), then the claim does not require a "first" (or so on) of that element.

Method steps disclosed anywhere herein, including in the claims, may be performed in any feasible/possible order. Recitation of method steps in any given order in the claims or elsewhere does not imply that the steps must be performed in that order—such claims and descriptions are intended to cover the steps performed in any order except any orders which are technically impossible or not feasible. However, in some implementations method steps may be performed in the order(s) in which the steps are presented herein, including any order(s) presented in the claims.

What is claimed is:

1. A method for facilitating decentralized autonomous organizations (DAOs), comprising:
   using one or more computer processors:
      receiving, from each of a plurality of parties, one or more inputs, wherein receiving the one or more inputs from each of the parties comprises receiving the one or more inputs from software agents of the parties, the software agents configured for automated cryptographically signed interactions;
      based on the one or more inputs, establishing a contract between and among the parties, wherein the contract provides governance for a decentralized autonomous organization (DAO);
      generating a hash of the contract;
      adding cryptographic signatures to the hash from each of the parties, thereby establishing a cryptographically signed hash which validates a finalized contract, wherein the cryptographically signed hash comprises the hash and the cryptographic signatures;
      providing the cryptographically signed hash to each of the parties; and
      processing one or more actions initiated automatically by one of the software agents in response to one or more actions of another of the software agents.

2. The method of claim 1, wherein the finalized contract comprises a contextual serialization of data required to move data between separate data stores.

3. The method of claim 1, wherein the finalized contract facilitates smart voting whereby one of the parties programs its software agent to follow, or delegate a proxy vote to, another of the parties or any combination of the parties.

4. The method of claim 1, wherein the finalized contract is human readable and legally enforceable.

5. The method of claim 1, further comprising providing the cryptographically signed hash to one of an immutable log, an immutable ledger, a blockchain, and any combination thereof, to provide auditable proof of the finalized contract.

6. The method of claim 1, wherein the DAO is an interoperable autonomous agent-based organization (IABO).

7. The method of claim 1, wherein the finalized contract is not self-executing but is self-validating and non-repudiable.

8. The method of claim 1, further comprising providing a signed hash of every transaction associated with the DAO to a superset of all audit trail locations provided by the parties, the audit trail locations comprising one of an immutable log, an immutable ledger, a blockchain, and any combination thereof.

9. A method for facilitating decentralized autonomous organizations (DAOs) and associated tokens, comprising:
using one or more computer processors:
receiving, from each of a plurality of parties, one or more inputs, wherein receiving the one or more inputs from each of the parties comprises receiving the one or more inputs from software agents of the parties, the software agents configured for automated cryptographically signed interactions;
based on the one or more inputs, establishing a contract between and among the parties, wherein the contract provides governance for a decentralized autonomous organization (DAO);
generating a hash of the contract;
adding cryptographic signatures to the hash from each of the parties, thereby establishing a cryptographically signed hash which validates a finalized contract, wherein the cryptographically signed hash comprises the hash and the cryptographic signatures;
providing the cryptographically signed hash to each of the parties; and
processing one or more actions initiated automatically by one of the software agents in response to one or more actions of another of the software agents;
wherein one of the finalized contract and an additional contract allows the parties to purchase and sell tokens associated with the DAO using software agents of a purchasing party and a selling party.

10. The method of claim 9, wherein the additional contract is between one of the parties and the DAO.

11. The method of claim 9, wherein the additional contract is between two or more of the parties.

12. The method of claim 9, further comprising identifying the purchasing party using a decentralized identifier (DID).

13. The method of claim 9, further comprising the software agents of the purchasing party and the selling party each sending cryptographic signatures over a hash associated with a token sale to one or more immutable repositories, the one or more immutable repositories including one of an immutable log, an immutable ledger, a blockchain, and any combination thereof.

14. The method of claim 13, wherein the one or more immutable repositories includes all immutable repositories specified by the parties who own tokens.

15. The method of claim 9, wherein the tokens comprise commodity index tokens (CITs) whose value is pegged to one or more indices of commodity prices.

16. The method of claim 9, wherein the tokens comprise commodity asset tokens (CATs) whereby proceeds from a token sale are invested by purchasing one of one or more commodities, one or more commodity options, one or more commodity futures, one or more commodity spot trades, and any combination thereof.

17. The method of claim 9, wherein the tokens comprise one or more non-fungible tokens (NFTs).

18. A method for facilitating nonfungible token (NFT) ownership and exchange, comprising:
using one or more computer processors:
receiving, from each of a plurality of parties, one or more inputs, wherein receiving the one or more inputs from each of the parties comprises receiving the one or more inputs from software agents of the parties, the software agents configured for automated cryptographically signed interactions;
based on the one or more inputs, establishing a contract between and among the parties, wherein the contract facilitates ownership and exchange of one or more nonfungible tokens (NFTs);
generating a hash of the contract;
adding cryptographic signatures to the hash from each of the parties, thereby establishing a cryptographically signed hash which validates a finalized contract, wherein the cryptographically signed hash comprises the hash and the cryptographic signatures;
providing the cryptographically signed hash to each of the parties; and
processing one or more actions initiated automatically by one of the software agents in response to one or more actions of another of the software agents;
wherein one of the finalized contract and an additional contract allows the parties to purchase and sell the one or more NFTs using software agents of a purchasing party and a selling party.

19. An apparatus for facilitating decentralized autonomous organizations (DAOs), comprising:
one or more servers, comprising one or more computer processors, configured to:
receive, from each of a plurality of parties, one or more inputs, wherein receiving the one or more inputs from each of the parties comprises receiving the one or more inputs from software agents of the parties, the software agents configured for automated cryptographically signed interactions;
based on the one or more inputs, establish a contract between and among the parties, wherein the contract provides governance for a decentralized autonomous organization (DAO);
generate a hash of the contract;
add cryptographic signatures to the hash from each of the parties, thereby establishing a cryptographically signed hash which validates a finalized contract, wherein the cryptographically signed hash comprises the hash and the cryptographic signatures;
provide the cryptographically signed hash to each of the parties; and
process one or more actions initiated automatically by one of the software agents in response to one or more actions of another of the software agents.

* * * * *